US012669986B2

(12) United States Patent
Kolli et al.

(10) Patent No.: US 12,669,986 B2
(45) Date of Patent: Jun. 30, 2026

(54) GUARDRAIL SYSTEM FOR SOFTWARE DELIVERY AND INFRASTRUCTURE RECONFIGURATION

(71) Applicant: Bank of America Corporation, Charlotte, NC (US)

(72) Inventors: Mohan Kishore Kolli, McKinney, TX (US); Debraj Goswami, Hyderabad (IN); Lev Goldberg, East Hampton, NY (US); Dilip Chandran Nair, Mumbai (IN); Deepak Suresh Dhokane, Maharashtra (IN); Maris O. Abolins, Lafayette, CA (US); Edward Sofio, Cornelius, NC (US)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 18/785,631

(22) Filed: Jul. 26, 2024

(65) Prior Publication Data

US 2026/0030006 A1     Jan. 29, 2026

(51) Int. Cl.
G06F 8/60          (2018.01)
G06F 9/445         (2018.01)

(52) U.S. Cl.
CPC ............ G06F 8/60 (2013.01); G06F 9/44505 (2013.01)

(58) Field of Classification Search
CPC ................. G06F 1/32; G06F 9/44; G06F 1/12
See application file for complete search history.

(56) References Cited

U.S. PATENT DOCUMENTS

| | | |
|---|---|---|
| 7,865,888 B1 | 1/2011 | Qureshi et al. |
| 10,148,677 B2 | 12/2018 | Muddu et al. |
| 10,642,599 B1 | 5/2020 | Killmon et al. |
| 10,853,046 B2 | 12/2020 | Mudumbai et al. |
| 10,868,867 B2 | 12/2020 | Binder et al. |
| 11,093,227 B1 | 8/2021 | Shteyman et al. |
| 11,157,253 B1 | 10/2021 | Shteyman et al. |
| 11,184,224 B2 | 11/2021 | Johnson et al. |

(Continued)

FOREIGN PATENT DOCUMENTS

CA          2824598 C      7/2016

*Primary Examiner* — Keshab R Pandey
(74) *Attorney, Agent, or Firm* — Banner & Witcoff, Ltd.

(57) ABSTRACT

Systems and methods are disclosed for an advanced guardrail for automated software deployment and infrastructure reconfiguration, enhancing reliability and security in complex IT environments. It features an IntelliModule that integrates with existing deployment tools to provide intelligent decision-making. The system retrieves DNS information via a Remote Query Interface (RQI) and compares it with current pod inventories to identify live pods, supplemented by additional DNS queries. A Splunk API determines server status based on traffic data, which is compared with DNS results. An Active Nodes Registry (ANR), updated via an encrypted 5G network, provides real-time, independent server status. The IntelliModule applies decision-making rules to validate deployment targets, ensuring deployments proceed only with current and reliable data. Secure communication channels and structured data formats enhance the system's flexibility, scalability, and reliability. This multi-faceted approach mitigates risks of erroneous deployments to live as opposed to dark servers and ensures robust software delivery management.

20 Claims, 9 Drawing Sheets

(56)         References Cited

U.S. PATENT DOCUMENTS

| | | | |
|---|---|---|---|
| 2006/0176822 A1* | 8/2006 | Doyle | ..................... H04L 69/40 |
| | | | 370/392 |
| 2021/0232493 A1* | 7/2021 | Aletty | ................. G06F 11/3409 |
| 2022/0078081 A1 | 3/2022 | Mahdi et al. | |

* cited by examiner

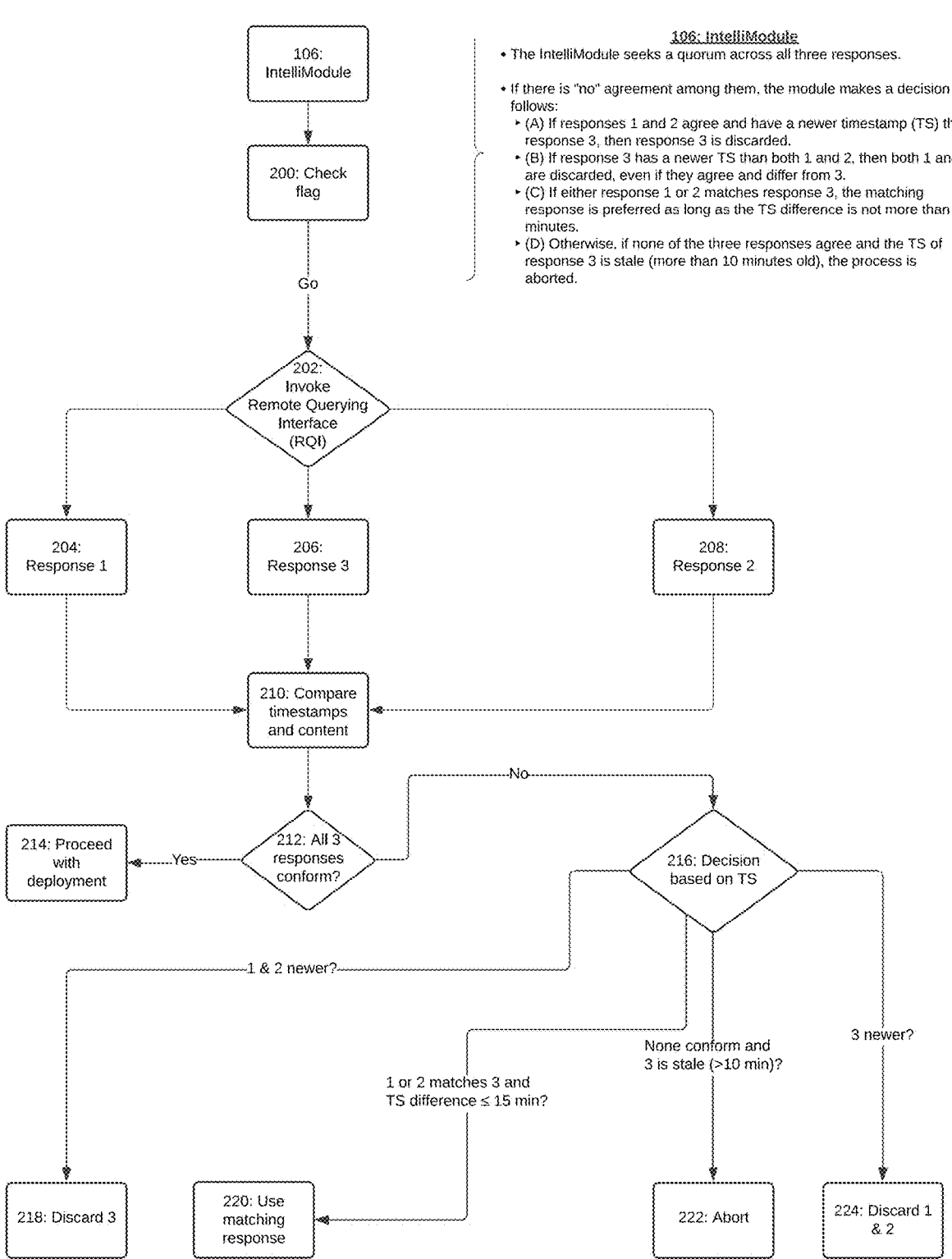

106: IntelliModule
- The IntelliModule seeks a quorum across all three responses.
- If there is "no" agreement among them, the module makes a decision as follows:
  - (A) If responses 1 and 2 agree and have a newer timestamp (TS) than response 3, then response 3 is discarded.
  - (B) If response 3 has a newer TS than both 1 and 2, then both 1 and 2 are discarded, even if they agree and differ from 3.
  - (C) If either response 1 or 2 matches response 3, the matching response is preferred as long as the TS difference is not more than 15 minutes.
  - (D) Otherwise, if none of the three responses agree and the TS of response 3 is stale (more than 10 minutes old), the process is aborted.

FIG. 2

Schematic of the DNS Resolver for Active POD Identification

Schematic of the SPLUNK Methodology for Active POD Identification

Encrypted Tunnel over a 5G Backbone - Active Nodes Registry

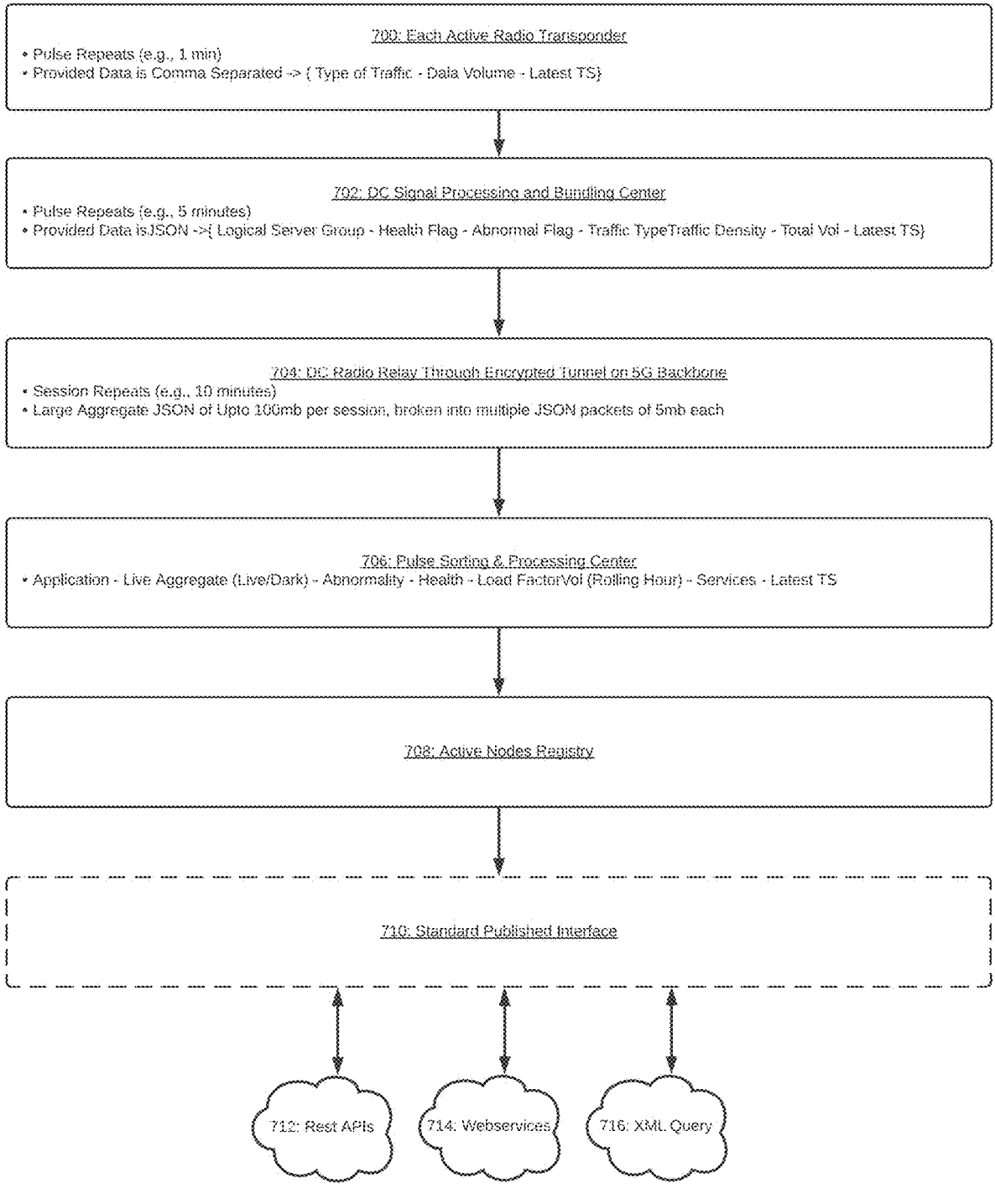

Data Bundling Protocols for Active Nodes Registry

700: Each Active Radio Transponder
• Pulse Repeats (e.g., 1 min)
• Provided Data is Comma Separated -> ( Type of Traffic - Data Volume - Latest TS)

702: DC Signal Processing and Bundling Center
• Pulse Repeats (e.g., 5 minutes)
• Provided Data is JSON ->{ Logical Server Group - Health Flag - Abnormal Flag - Traffic TypeTraffic Density - Total Vol - Latest TS}

704: DC Radio Relay Through Encrypted Tunnel on 5G Backbone
• Session Repeats (e.g., 10 minutes)
• Large Aggregate JSON of Upto 100mb per session, broken into multiple JSON packets of 5mb each 706: Pulse Sorting & Processing Center
• Application - Live Aggregate (Live/Dark) – Abnormality - Health - Load FactorVol (Rolling Hour) – Services - Latest TS 708: Active Nodes Registry 710: Standard Published Interface 712: Rest APIs          714: Webservices          716: XML Query

FIG. 7

GUARDRAIL SYSTEM FOR SOFTWARE DELIVERY AND INFRASTRUCTURE RECONFIGURATION

TECHNICAL FIELD

The inventions disclosed herein pertain to the field of electrical computers and digital processing systems, specifically to multicomputer data transferring. They involve the management and coordination of data transfer between multiple computer systems, which includes the methods and systems for transferring data within distributed computing environments. The described guardrail system integrates multiple computing systems and networks to ensure accurate and safe software deployment by leveraging independent validation processes using various data sources and communication protocols.

DESCRIPTION OF THE RELATED ART

The rapid adoption of end-to-end automation in the software lifecycle has led to the instant automated deployment of new codebases and the dynamic routing of traffic from active servers. As organizations embrace DevOps philosophies, on-demand code pushes are becoming increasingly frequent. This constant flux in deployments introduces a critical problem, particularly in complex infrastructure architectures that utilize concepts like pods and slices and rotate light and dark servers. Automated systems often mistakenly target the wrong server, which can lead to significant operational disruptions and potential financial losses. The issue is compounded by the nature of modern infrastructures, where only a subset of servers actively handles live traffic while the rest remain in a dark state, not receiving any real-time requests.

In such complex environments, the traditional practice of deploying new code to dark servers, followed by a controlled traffic switch, becomes prone to errors. Post-deployment swings—where traffic is gradually shifted from old live servers to newly updated ones—sometimes fail to properly update the server status. This oversight can result in scenarios where previous live servers erroneously remain active or newly activated servers are incorrectly flagged as dark. Consequently, deployments intended for non-live environments inadvertently reach live servers, causing immediate service interruptions and potentially exposing sensitive data to risks.

Current deployment tools, despite their automation capabilities, lack the intelligence to discern between live and dark servers effectively. They operate on predefined endpoints without verifying the real-time status of the target servers. This deficiency means that even with manual checks and rigorous validation steps, human error remains a persistent threat. Deployment engineers, tasked with pushing numerous updates across diverse servers and applications, can easily overlook a misconfigured endpoint, leading to unintended consequences.

The problem is further exacerbated by the isolation of the deployment systems from real-time monitoring tools. Traditional tools do not interact seamlessly with monitoring systems like Splunk or network-level DNS configurations, making it difficult to ascertain the live status of servers dynamically. Without an integrated approach that combines deployment with real-time status checks, the risk of erroneous deployments remains high.

Moreover, infrastructure complexities, such as the use of multiple DNS servers and traffic management tools, add another layer of potential failure points. DNS servers, which should accurately map service URLs to the correct servers, can sometimes return outdated or incorrect responses due to synchronization issues or network delays. These inaccuracies contribute to the overall challenge of ensuring that deployments target only the intended dark servers.

Another significant issue arises from the reliance on a single validation method. When deployment tools depend on one source of truth, any error or delay in that system can cascade into the deployment process, leading to flawed deployments. For instance, if a DNS query returns an outdated server list or if Splunk fails to reflect the current traffic status, the deployment process cannot proceed accurately. The lack of redundancy in validation mechanisms thus poses a critical risk.

Additionally, the modern threat landscape, characterized by cyber-attacks and network outages, demands a robust and fail-safe deployment process. During network disruptions or isolation exercises, deployment systems that rely solely on the primary network become vulnerable. Without an alternative communication path, it becomes challenging to ensure the reliability and security of the deployment process.

Organizations have long struggled with these issues, employing various ad hoc solutions such as manual checks, extensive logging, and repeated validations. However, these measures are labor-intensive, error-prone, and do not scale well with the increasing complexity and frequency of deployments. The absence of a standardized, intelligent system that can autonomously validate deployment targets and handle discrepancies has been a significant gap in the field.

The long-felt and unmet need for this invention lies in its ability to integrate intelligence into the deployment process, providing a multi-faceted validation system that dynamically verifies server status across multiple dimensions. By addressing the shortcomings of traditional deployment tools and incorporating real-time monitoring and independent validation methods, the invention fulfills a critical need for a reliable, automated, and intelligent deployment guardrail system. This need has been persistent due to the increasing complexity of IT infrastructures and the high stakes associated with deployment errors, making the invention a timely and essential solution for modern enterprises.

SUMMARY OF THE INVENTION

The inventions described herein represent a revolutionary advancement in the domain of automated software deployment and infrastructure reconfiguration. The primary problem it addresses is the high risk of erroneous deployments in complex IT environments, which can lead to significant operational disruptions and financial losses. The rapid adoption of DevOps methodologies and end-to-end automation in software lifecycles has increased the frequency of code deployments. This surge in deployment activities has highlighted a critical need for systems that can dynamically verify deployment targets and prevent mistakes.

At the core of this invention is the IntelliModule, a sophisticated decision-making engine that significantly enhances the functionality of traditional deployment tools such as Ansible, UDeploy, and InstallExpress. These tools, while effective in automating deployment tasks, lack the built-in intelligence to validate deployment targets in real-time. The IntelliModule bridges this gap by integrating seamlessly with these tools and enabling them to make informed decisions based on real-time data from multiple sources. It achieves this by seeking a quorum across three independent responses: the Remote Query Interface (RQI), the Splunk API, and the Active Nodes Registry (ANR).

The decision-making process of the IntelliModule is designed to be both robust and flexible. It begins by querying the RQI to retrieve information about the DNS servers associated with the target application URL. This information is then compared against the current pod inventory to determine which pods are live. The system further executes 'dig' commands on each DNS to identify additional live pods. This comprehensive DNS-based validation ensures that all live pods are detected and compiled into an array. The deployment environment is then checked against this array to prevent unintended deployments to live servers. This meticulous validation process is crucial in avoiding errors caused by outdated or incorrect DNS responses.

The Splunk API integration adds another layer of validation, leveraging Splunk's powerful monitoring capabilities to determine the live or dark status of servers based on traffic data. The system can run a Splunk search, execute a saved Splunk macro, or pass values to individual parameters, offering flexibility in how it interacts with Splunk. The results from the Splunk API provide real-time insights into server activity, which are crucial for making informed deployment decisions. By incorporating Splunk's real-time monitoring data, the system can dynamically validate the status of deployment targets, reducing the risk of errors caused by outdated information.

The Active Nodes Registry (ANR) is a standout feature of the invention, serving as the ultimate source of truth for deployment validation. The ANR is updated via an encrypted 5G network, ensuring that it operates independently of the primary network. This independence is critical for maintaining accurate and reliable data, especially during network failures or cyber-attacks. Each server within the data centers is equipped with active radio transponders that send periodic data pulses. These pulses are processed and bundled at the data center level before being transmitted over the 5G backbone. The ANR consolidates this data, providing the most current and reliable information about server status. This independent verification mechanism is essential for resolving discrepancies when there is no agreement between the DNS and Splunk data.

The decision-making rules employed by the IntelliModule are intricately designed to handle various scenarios. If the responses from the DNS and Splunk agree but differ from the ANR, and the ANR data is outdated, the deployment is aborted to prevent potential errors. If the ANR data is more recent, it overrides the other responses, ensuring that the most reliable and timely information guides the deployment process. These rules are vital for ensuring that only the correct servers are targeted, significantly reducing the risk of erroneous deployments. The ANR acts as a tiebreaker in ambiguous situations, providing a definitive answer based on the latest available data.

The invention also addresses the critical need for secure communication during deployments. By utilizing an encrypted tunnel over a 5G backbone, the system ensures that the ANR data remains secure and reliable, even in the event of primary network failures or cyber-attacks. This secure channel is crucial for maintaining the integrity of the deployment process, offering a robust safeguard against potential disruptions. The use of a dedicated 5G network provides a high-speed, low-latency communication path, ensuring that the ANR data is always up-to-date and available for decision-making.

The system's innovative use of contemporary technologies and programming constructs, such as JSON for data transmission, ensures that it is both flexible and scalable. It can be easily integrated with existing deployment tools, enhancing their capabilities without requiring significant changes to the underlying infrastructure. This compatibility makes the invention a practical and valuable addition to any organization's deployment toolkit. By leveraging JSON for data exchange, the system ensures that data is transmitted efficiently and accurately between different components, facilitating seamless integration and operation.

Furthermore, the invention's ability to dynamically validate deployment targets in real-time addresses a long-standing challenge in software delivery. Traditional deployment tools are often static, relying on predefined endpoints that may not reflect the current server status. By continuously updating and validating server status through multiple independent sources, the invention ensures that deployments are accurate and reliable, minimizing the risk of operational disruptions. This dynamic validation process is essential for maintaining the stability and reliability of IT operations, particularly in environments with frequent and complex deployments.

The invention also includes a robust mechanism for handling edge cases and anomalies. For example, if none of the three sources (DNS, Splunk, ANR) provide consistent data, and the ANR data is stale, the system aborts the deployment to avoid potential risks. This precautionary measure ensures that deployments are only made when there is sufficient confidence in the data, preventing accidental disruptions. The system's ability to handle such edge cases demonstrates its robustness and reliability, making it a critical tool for organizations with complex IT environments.

Moreover, the invention's architecture ensures high availability and fault tolerance. The use of an encrypted 5G backbone for updating the ANR means that the system can continue to operate even during network outages or cyber-attacks. This redundancy is vital for ensuring continuous operation and reliable deployments. The system's architecture also allows for easy scalability, enabling organizations to expand their deployment capabilities as needed without compromising on reliability or security.

In conclusion, this invention represents a significant advancement in the field of automated software deployment and infrastructure reconfiguration. By integrating intelligent decision-making capabilities, leveraging multiple independent data sources, and ensuring secure communication through an encrypted 5G backbone, the invention addresses the critical challenges of modern IT operations. Its comprehensive approach to deployment validation significantly enhances the reliability and security of the deployment process, fulfilling a long-standing and unmet need in the industry. This innovative solution provides organizations with the tools they need to manage their deployments effectively, reducing the risk of errors and ensuring the smooth operation of their IT infrastructure. The invention's robust, flexible, and scalable nature ensures that it can adapt to the evolving needs of modern enterprises, making it an indispensable tool for ensuring successful and error-free software deployments.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, the method for automated software deployment and infrastructure reconfiguration using a guardrail system includes retrieving DNS information from a Remote Query Interface (RQI) by executing 'dig' or 'nslookup' commands on the application URL to determine the IP addresses associated with the URL. The IntelliModule then compares the retrieved DNS information against the current pod inventory to determine which pods are live by matching IP addresses and pod identifiers. It further executes additional 'dig' commands on the application URL against each DNS server to identify further live pods, ensuring that all DNS responses are captured. The IntelliModule compiles an array of all identified live pods by aggregating the results from multiple DNS queries, thus forming a complete and accurate list of live servers. It checks the deployment environment against the compiled array of live pods to prevent deployments to live servers by performing a string comparison of environment names.

In some arrangements, the method includes running a Splunk API call to ascertain the live or dark status of servers based on traffic data, using one of a Splunk search, a saved Splunk macro, or passing values to individual parameters, to determine server activity levels. The IntelliModule compares the results from the Splunk API call with the DNS information to validate server status and ensure consistency across data sources. It updates the server status via the Active Nodes Registry (ANR) using an encrypted 5G network, which employs periodic data pulses sent by active radio transponders from servers within data centers. The IntelliModule processes the data pulses at the data center level before transmitting them over the 5G backbone, aggregating data from multiple transponders and ensuring accurate status reporting.

In some arrangements, the ANR consolidates the data from the processed pulses to provide current and reliable server status information by creating a unified status report from all received data pulses. The IntelliModule compares the ANR data with the results from the DNS information and Splunk API call to ensure all data sources agree on the server status. It applies predefined decision-making rules to determine the validity of deployment targets based on the agreement or disagreement among the DNS information, Splunk API results, and ANR data, including timestamp comparisons and content analysis to ensure the most reliable data is used for decisions. The IntelliModule aborts the deployment if the results from the DNS information and Splunk API agree but differ from outdated ANR data, ensuring that stale data does not influence deployment decisions.

In some arrangements, the IntelliModule proceeds with the deployment if the ANR data is more recent and differs from the DNS information and Splunk API results, relying on the most current data for decision making and ensuring the accuracy of deployments. The method further utilizes an encrypted tunnel over the 5G backbone for secure communication during the deployment process, protecting data integrity and preventing unauthorized access. The IntelliModule ensures the flexibility and scalability of the system by using JSON for data transmission between components, allowing for efficient data parsing and system integration, and facilitating seamless communication across different parts of the deployment process.

In some arrangements, the DNS information is retrieved from multiple DNS servers to enhance the accuracy of the live pod identification, reducing the risk of relying on a single point of failure and ensuring comprehensive validation. The IntelliModule discards the results from the DNS information if they do not match the most recent data from the ANR, prioritizing the most up-to-date and reliable data source, thus ensuring deployment decisions are based on the best available information.

In some arrangements, the Splunk API call includes evaluating traffic patterns to determine the load and performance status of the servers, providing a comprehensive view of server activity and aiding in making informed deployment decisions. The ANR updates the server status at fixed intervals of one minute to ensure real-time accuracy, allowing for continuous monitoring and immediate status updates, thus enhancing the reliability of the deployment process.

In some arrangements, the decision-making rules include a condition to abort the deployment if the ANR data is older than ten minutes and differs from the other sources, ensuring that only the freshest data guides the deployment process, thus reducing the risk of errors. The encrypted 5G network used for updating the ANR is isolated from the primary network to prevent interference and maintain data integrity, providing an additional layer of security and reliability, ensuring that updates to the ANR are always accurate and secure.

In some arrangements, the IntelliModule performs additional validation by cross-referencing the deployment environment with historical deployment data stored in the ANR, allowing for more informed decision-making based on past deployments and providing a context-aware deployment process. The JSON data transmission includes metadata tags to facilitate efficient parsing and processing by the IntelliModule, enhancing data organization and retrieval, and ensuring that all transmitted data is accurately interpreted and utilized by the system components. The IntelliModule generates detailed deployment logs that include timestamps and validation results from the DNS information, Splunk API, and ANR data, to support audit and troubleshooting processes, ensuring comprehensive documentation of the deployment process for future reference.

In some arrangements, the system for automated software deployment and infrastructure reconfiguration using a guardrail mechanism comprises an IntelliModule configured to retrieve DNS information from a Remote Query Interface (RQI) by executing 'dig' or 'nslookup' commands on the application URL to determine the IP addresses associated with the URL. The IntelliModule is further configured to compare the retrieved DNS information against the current pod inventory to determine which pods are live by matching IP addresses and pod identifiers, ensuring that deployment targets are correctly identified. The IntelliModule executes additional 'dig' commands on the application URL against each DNS server to identify further live pods, ensuring comprehensive capture of all DNS responses to accurately reflect the network status.

In some arrangements, the IntelliModule compiles an array of all identified live pods by aggregating the results from multiple DNS queries, thus forming a complete and accurate list of live servers. The IntelliModule checks the deployment environment against the compiled array of live pods to prevent deployments to live servers by performing a string comparison of environment names, thus avoiding inadvertent disruptions in live environments. The IntelliModule runs a Splunk API call to ascertain the live or dark status of servers based on traffic data, using one of a Splunk search, a saved Splunk macro, or passing values to individual parameters, to determine server activity levels and ensure deployments are made to appropriate environments.

In some arrangements, the IntelliModule compares the results from the Splunk API call with the DNS information to validate server status and ensure consistency across data sources, thus enhancing the reliability of deployment decisions. An Active Nodes Registry (ANR) is configured to update the server status via an encrypted 5G network using periodic data pulses sent by active radio transponders from servers within data centers, ensuring real-time status updates and independence from the primary network. The IntelliModule processes the data pulses at the data center level before transmitting them over the 5G backbone, aggregating data from multiple transponders and ensuring accurate status reporting across the network.

In some arrangements, the ANR consolidates the data from the processed pulses to provide current and reliable server status information by creating a unified status report from all received data pulses, ensuring the most up-to-date information is available for deployment decisions. The IntelliModule compares the ANR data with the results from the DNS information and Splunk API call to ensure all data sources agree on the server status, thus providing a comprehensive validation mechanism. The IntelliModule applies predefined decision-making rules to determine the validity of deployment targets based on the agreement or disagreement among the DNS information, Splunk API results, and ANR data, including timestamp comparisons and content analysis to ensure the most reliable data is used for decisions.

In some arrangements, the IntelliModule aborts the deployment if the results from the DNS information and Splunk API agree but differ from outdated ANR data, ensuring that stale data does not influence deployment decisions and reducing the risk of erroneous deployments. The IntelliModule proceeds with the deployment if the ANR data is more recent and differs from the DNS information and Splunk API results, relying on the most current data for decision making and ensuring the accuracy of deployments. The method utilizes an encrypted tunnel over the 5G backbone for secure communication during the deployment process, protecting data integrity and preventing unauthorized access to ensure the security of the deployment operations.

In some arrangements, the IntelliModule ensures the flexibility and scalability of the system by using JSON for data transmission between components, allowing for efficient data parsing and system integration, and facilitating seamless communication across different parts of the deployment process. The DNS information is retrieved from multiple DNS servers to enhance the accuracy of the live pod identification, reducing the risk of relying on a single point of failure and ensuring comprehensive validation. The IntelliModule discards the results from the DNS information if they do not match the most recent data from the ANR, prioritizing the most up-to-date and reliable data source, thus ensuring deployment decisions are based on the best available information.

In some arrangements, the Splunk API call includes evaluating traffic patterns to determine the load and performance status of the servers, providing a comprehensive view of server activity and aiding in making informed deployment decisions. The ANR updates the server status at fixed intervals of one minute to ensure real-time accuracy, allowing for continuous monitoring and immediate status updates, thus enhancing the reliability of the deployment process. The decision-making rules include a condition to abort the deployment if the ANR data is older than ten minutes and differs from the other sources, ensuring that only the freshest data guides the deployment process, thus reducing the risk of errors.

In some arrangements, the encrypted 5G network used for updating the ANR is isolated from the primary network to prevent interference and maintain data integrity, providing an additional layer of security and reliability, ensuring that updates to the ANR are always accurate and secure. The IntelliModule performs additional validation by cross-referencing the deployment environment with historical deployment data stored in the ANR, allowing for more informed decision-making based on past deployments and providing a context-aware deployment process. The JSON data transmission includes metadata tags to facilitate efficient parsing and processing by the IntelliModule, enhancing data organization and retrieval, and ensuring that all transmitted data is accurately interpreted and utilized by the system components.

In some arrangements, the system for automated software deployment and infrastructure reconfiguration using a guardrail mechanism comprises an IntelliModule configured to retrieve DNS information from a Remote Query Interface (RQI) by executing 'dig' or 'nslookup' commands on the application URL to determine the IP addresses associated with the URL. The IntelliModule is further configured to compare the retrieved DNS information against the current pod inventory to determine which pods are live by matching IP addresses and pod identifiers, ensuring that deployment targets are correctly identified. The IntelliModule executes additional 'dig' commands on the application URL against each DNS server to identify further live pods, ensuring comprehensive capture of all DNS responses to accurately reflect the network status.

In some arrangements, the IntelliModule compiles an array of all identified live pods by aggregating the results from multiple DNS queries, thus forming a complete and accurate list of live servers. The IntelliModule checks the deployment environment against the compiled array of live pods to prevent deployments to live servers by performing a string comparison of environment names, thus avoiding inadvertent disruptions in live environments. The IntelliModule runs a Splunk API call to ascertain the live or dark status of servers based on traffic data, using one of a Splunk search, a saved Splunk macro, or passing values to individual parameters, to determine server activity levels and ensure deployments are made to appropriate environments.

In some arrangements, the IntelliModule compares the results from the Splunk API call with the DNS information to validate server status and ensure consistency across data sources, thus enhancing the reliability of deployment decisions. An Active Nodes Registry (ANR) is configured to update the server status via an encrypted 5G network using periodic data pulses sent by active radio transponders from servers within data centers, ensuring real-time status updates and independence from the primary network. The IntelliModule processes the data pulses at the data center level before transmitting them over the 5G backbone, aggregating data from multiple transponders and ensuring accurate status reporting across the network.

In some arrangements, the ANR consolidates the data from the processed pulses to provide current and reliable server status information by creating a unified status report from all received data pulses, ensuring the most up-to-date information is available for deployment decisions. The IntelliModule compares the ANR data with the results from the DNS information and Splunk API call to ensure all data sources agree on the server status, thus providing a comprehensive validation mechanism. The IntelliModule applies predefined decision-making rules to determine the validity of deployment targets based on the agreement or disagreement among the DNS information, Splunk API results, and ANR data, including timestamp comparisons and content analysis to ensure the most reliable data is used for decisions.

In some arrangements, the IntelliModule aborts the deployment if the results from the DNS information and Splunk API agree but differ from outdated ANR data, ensuring that stale data does not influence deployment decisions and reducing the risk of erroneous deployments. The IntelliModule proceeds with the deployment if the ANR data is more recent and differs from the DNS information and Splunk API results, relying on the most current data for decision making and ensuring the accuracy of deployments. The method utilizes an encrypted tunnel over the 5G backbone for secure communication during the deployment process, protecting data integrity and preventing unauthorized access to ensure the security of the deployment operations.

In some arrangements, the IntelliModule ensures the flexibility and scalability of the system by using JSON for data transmission between components, allowing for efficient data parsing and system integration, and facilitating seamless communication across different parts of the deployment process. The DNS information is retrieved from multiple DNS servers to enhance the accuracy of the live pod identification, reducing the risk of relying on a single point of failure and ensuring comprehensive validation. The IntelliModule discards the results from the DNS information if they do not match the most recent data from the ANR, prioritizing the most up-to-date and reliable data source, thus ensuring deployment decisions are based on the best available information.

In some arrangements, the Splunk API call includes evaluating traffic patterns to determine the load and performance status of the servers, providing a comprehensive view of server activity and aiding in making informed deployment decisions. The ANR updates the server status at fixed intervals of one minute to ensure real-time accuracy, allowing for continuous monitoring and immediate status updates, thus enhancing the reliability of the deployment process. The decision-making rules include a condition to abort the deployment if the ANR data is older than ten minutes and differs from the other sources, ensuring that only the freshest data guides the deployment process, thus reducing the risk of errors.

In some arrangements, the encrypted 5G network used for updating the ANR is isolated from the primary network to prevent interference and maintain data integrity, providing an additional layer of security and reliability, ensuring that updates to the ANR are always accurate and secure. The IntelliModule performs additional validation by cross-referencing the deployment environment with historical deployment data stored in the ANR, allowing for more informed decision-making based on past deployments and providing a context-aware deployment process. The JSON data transmission includes metadata tags to facilitate efficient parsing and processing by the IntelliModule, enhancing data organization and retrieval, and ensuring that all transmitted data is accurately interpreted and utilized by the system components.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 2 details the decision-making process of the IntelliModule, showing how it evaluates data from the DNS, Splunk API, and ANR to determine deployment validity. The IntelliModule applies predefined rules to ensure that only the most current and reliable data guides the deployment decisions.

FIG. 7 depicts the integration and operation of the ANR, detailing how data from active radio transponders is processed, encrypted, and transmitted over a 5G network to maintain up-to-date server status information. The ANR data is then used by the IntelliModule to validate deployment targets, ensuring accurate and secure software deployments.

DETAILED DESCRIPTION

Figure 1:
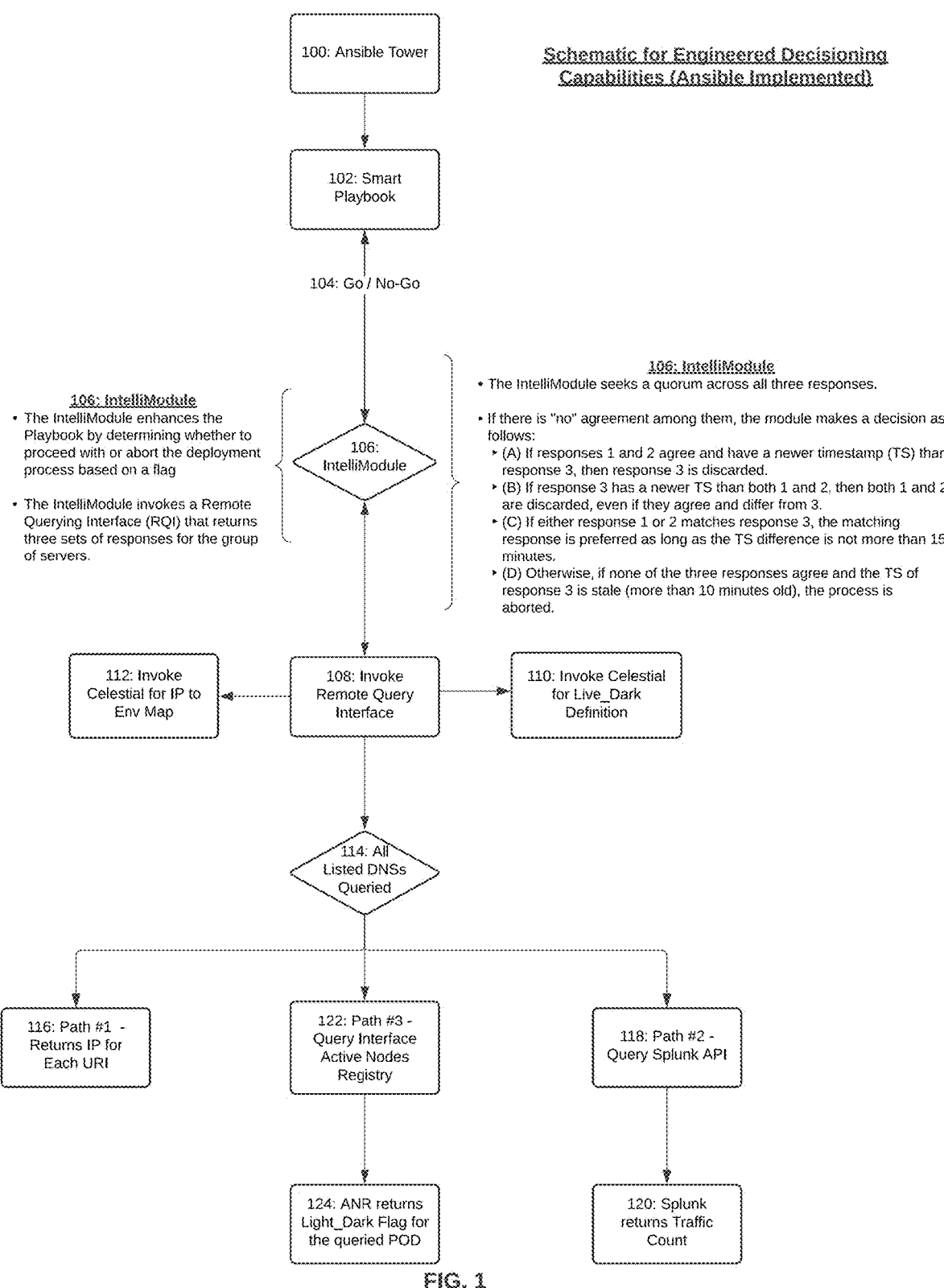
FIG. 1 illustrates the overall architecture of the guardrail system for automated software deployment, highlighting the integration of the IntelliModule with Ansible Tower, Splunk API, DNS queries, and the Active Nodes Registry (ANR). The system ensures accurate and secure deployments by validating deployment targets using real-time data from multiple independent sources.

The invention is a groundbreaking guardrail system designed to enhance the reliability and security of automated software deployment processes in complex IT environments. As organizations increasingly adopt DevOps methodologies and end-to-end automation, the frequency and complexity of code deployments have surged. This has introduced significant challenges in ensuring that deployments target the correct servers, particularly in infrastructures utilizing concepts like pods and slices. Traditional deployment tools lack the intelligence to dynamically verify deployment targets, often leading to erroneous deployments on live servers and subsequent operational disruptions.

Central to this invention is the IntelliModule, a sophisticated decision-making engine that integrates with existing deployment tools such as Ansible, UDeploy, and InstallExpress. The IntelliModule enables these tools to make informed decisions by seeking a quorum across three independent responses: the Remote Query Interface (RQI), the Splunk API, and the Active Nodes Registry (ANR). This multi-layered validation process ensures that deployments are only made to the appropriate servers, significantly reducing the risk of errors.

The DNS Resolver plays a crucial role in the system by accurately identifying active pods. It executes 'dig' or 'nslookup' commands from the tower host on the application URL to retrieve DNS information. This data is then compared against the current pod inventory to determine which pods are live. Additional DNS queries are conducted to identify further live pods, compiling all identified live pods into an array. The deployment environment is subsequently checked against this array to prevent deployments to live servers, ensuring that only the intended dark servers are targeted.

Integration with the Splunk API provides another critical layer of validation. The system can run a Splunk search, execute a saved Splunk macro, or pass values to individual parameters to determine the live or dark status of servers based on traffic data. This integration leverages Splunk's powerful monitoring capabilities, offering real-time insights into server activity that are essential for accurate deployment decisions. The use of real-time data from Splunk enhances the system's ability to dynamically validate deployment targets.

The Active Nodes Registry (ANR) is a key component, serving as the gold standard for deployment validation. The ANR is updated via an encrypted 5G network, which ensures its independence from the primary network. This independence is crucial for maintaining reliable data, especially during network failures or cyber-attacks. Servers within the data centers are equipped with active radio transponders that send periodic data pulses. These pulses are processed and bundled at the data center level before being transmitted over the 5G backbone. The ANR consolidates this data, providing the most current and reliable information about server status.

The IntelliModule's decision-making rules are intricately designed to handle various scenarios. If responses from the DNS and Splunk agree but differ from the ANR, and the ANR data is outdated, the deployment is aborted to avoid potential errors. Conversely, if the ANR data is more recent, it takes precedence, ensuring that the most reliable information guides the deployment process. These rules ensure that only the correct servers are targeted, significantly reducing the risk of erroneous deployments. The ANR acts as a tiebreaker in cases of ambiguity, providing definitive validation.

Secure communication during deployments is another critical aspect of the invention. By utilizing an encrypted tunnel over a 5G backbone, the system ensures that the ANR data remains secure and reliable, even in the event of primary network failures or cyber-attacks. This secure channel is vital for maintaining the integrity of the deployment process, providing a robust safeguard against potential disruptions. The use of a dedicated 5G network offers a high-speed, low-latency communication path, ensuring that the ANR data is always up-to-date.

The system's innovative use of contemporary technologies and programming constructs, such as JSON for data transmission, ensures flexibility and scalability. It can be easily integrated with existing deployment tools, enhancing their capabilities without requiring significant changes to the underlying infrastructure. This compatibility makes the invention a practical and valuable addition to any organization's deployment toolkit. By using JSON for data exchange, the system ensures efficient and accurate transmission between different components, facilitating seamless integration.

Furthermore, the invention's ability to dynamically validate deployment targets in real-time addresses a longstanding challenge in software delivery. Traditional deployment tools often rely on predefined endpoints that may not reflect the current server status. By continuously updating and validating server status through multiple independent sources, the invention ensures accurate and reliable deployments, minimizing operational disruptions. This dynamic validation process is crucial for maintaining the stability and reliability of IT operations, particularly in environments with frequent and complex deployments.

The invention also includes robust mechanisms for handling edge cases and anomalies. For instance, if none of the three sources (DNS, Splunk, ANR) provide consistent data, and the ANR data is stale, the system aborts the deployment to prevent potential risks. This precautionary measure ensures deployments only proceed when there is sufficient confidence in the data, preventing accidental disruptions. The system's ability to handle such edge cases demonstrates its robustness and reliability, making it a critical tool for complex IT environments.

In summary, the invention represents a significant advancement in automated software deployment and infrastructure reconfiguration. By integrating intelligent decision-making capabilities, leveraging multiple independent data sources, and ensuring secure communication through an encrypted 5G backbone, the invention addresses critical challenges in modern IT operations. Its comprehensive approach to deployment validation significantly enhances the reliability and security of the deployment process, fulfilling a long-standing and unmet need in the industry. This innovative solution equips organizations with the tools needed to manage deployments effectively, reducing errors and ensuring smooth IT operations. The invention's robust, flexible, and scalable nature ensures it can adapt to the evolving needs of modern enterprises, making it an indispensable tool for ensuring successful and error-free software deployments.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP):

This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

In FIG. 1, the system for automated software deployment and infrastructure reconfiguration is illustrated, highlighting the comprehensive guardrail mechanism designed to ensure accurate and secure deployments in complex IT environments. Ansible Tower (100) serves as the central orchestrator for managing and automating deployment processes. The Ansible Tower interfaces with the Smart Playbook (102), a sophisticated component that contains detailed deployment instructions and logic for invoking various validation checks essential for maintaining deployment integrity.

Central to the deployment validation process is the IntelliModule (106), a powerful decision-making engine that enhances traditional deployment tools like Ansible by incorporating intelligent decision-making capabilities. The IntelliModule is responsible for orchestrating the retrieval and comparison of data from multiple independent sources to validate the deployment targets.

The process begins with the IntelliModule invoking the Remote Query Interface (RQI) (108) to gather DNS information. It does this by executing 'dig' or 'nslookup' commands on the application URL (404) to determine the IP addresses associated with the URL. This information is crucial as it provides a snapshot of the DNS configuration for the application. The retrieved DNS information is then compared against the current pod inventory to identify which pods are live. The IntelliModule ensures thorough validation by executing additional 'dig' commands on the application URL against each DNS server (114) listed in the deployment configuration. This step ensures that all potential DNS responses are captured and considered. The results from these DNS queries form the first path (116) in the multi-faceted validation process.

Simultaneously, the IntelliModule invokes the Splunk API (118) to determine the live or dark status of the servers based on real-time traffic data. This involves running a Splunk search, executing a saved Splunk macro, or passing specific values to individual parameters. The Splunk API call returns detailed insights into server activity levels, such as traffic counts and server performance metrics, which are critical for understanding the current operational state of the servers. These insights form the second path (120) in the validation process, providing a comprehensive view of server activity.

The third validation path (122) involves querying the Active Nodes Registry (ANR). The ANR is continuously updated via an encrypted 5G network (612), using periodic data pulses sent by active radio transponders from servers within data centers (600, 602, 604). These transponders act as beacons, sending out regular updates on server status, which are processed at the data center level (606) before being transmitted over the 5G backbone. This ensures that the data is aggregated accurately and transmitted securely. The ANR consolidates this data to provide the most current and reliable server status information (618), which is then used by the IntelliModule.

The IntelliModule compares the data from these three paths: DNS information (Path #1), Splunk API results (Path #2), and ANR data (Path #3). It applies a set of predefined decision-making rules to determine the validity of the deployment targets. These rules include comparing timestamps and content from the different data sources to identify discrepancies. For example, if the results from Path #1 and Path #2 agree and have a more recent timestamp than Path #3, the ANR data is discarded. Conversely, if the ANR data is more recent, it takes precedence over the other two paths. If either Path #1 or Path #2 matches the ANR data, the matching response is preferred, provided the timestamp difference is within a 15-minute threshold. If none of the three responses agree and the ANR data is older than ten minutes, the deployment process is aborted to prevent potential errors.

Once the validation process is complete, the IntelliModule makes a Go/No-Go decision (104). If the validation confirms that the deployment environment is appropriate, the system proceeds with the deployment. However, if any discrepancies or outdated data are detected, the deployment is halted to avoid potential disruptions.

To ensure secure communication throughout this process, the IntelliModule utilizes an encrypted tunnel over the 5G backbone (612), protecting data integrity and preventing unauthorized access. This secure communication channel is critical for maintaining the confidentiality and integrity of the data exchanged between the various components of the system.

The system's flexibility and scalability are further enhanced by using JSON for data transmission between components. This structured data format allows for efficient data parsing and seamless integration across different parts of the deployment process. By leveraging JSON, the system can easily adapt to changes in deployment configurations and integrate with other tools and systems within the IT infrastructure.

Overall, FIG. 1 illustrates a robust and intelligent system for automated software deployment and infrastructure reconfiguration. By integrating multiple independent validation sources, including DNS information, Splunk API results, and ANR data, and employing secure communication channels, the system mitigates the risks associated with erroneous deployments. This comprehensive approach ensures that deployments are accurate, reliable, and secure, addressing the critical challenges of modern IT operations and enhancing the overall robustness of the software delivery process.

In FIG. 2, the detailed operations of the IntelliModule (106) within the automated software deployment and infrastructure reconfiguration system are presented. This figure highlights the systematic process and rigorous decision-making rules applied by the IntelliModule to ensure the precision and security of deployments.

The process starts with the IntelliModule checking a deployment flag (200) to determine if the deployment process should proceed. This flag acts as a preliminary filter, ensuring that only relevant and necessary deployments move forward to the subsequent validation steps. After the flag check, the IntelliModule invokes the Remote Query Interface (RQI) (202), which is responsible for initiating a series of queries to gather DNS information. The RQI executes 'dig' or 'nslookup' commands on the application URL to retrieve DNS details for the target servers. This step is crucial for understanding the DNS configuration and identifying the IP addresses associated with the application URL.

The gathered DNS information results in three distinct responses (204, 206, 208), each representing different sources or perspectives of the server status. These responses are meticulously compared by the IntelliModule, focusing on their timestamps and content (210). This comparison step is vital as it helps to identify any discrepancies and determine which data is the most reliable and current.

If all three responses conform (212), indicating a clear and unanimous validation, the IntelliModule proceeds with the deployment (214). This conformity implies that the data from all sources agree, providing a strong validation for the deployment process. However, if the responses do not conform, the IntelliModule evaluates their timestamps to make a decision (216). If responses 1 and 2 are newer than response 3, indicating that response 3 is outdated, response 3 is discarded (218). The deployment decision is then based on the agreement between the first two responses, ensuring that the most recent and reliable data guides the deployment.

Conversely, if response 3 has a more recent timestamp than both responses 1 and 2, responses 1 and 2 are discarded (224). In this scenario, the decision relies on the most recent data from response 3, ensuring that the latest information is used for deployment validation. If either response 1 or 2 matches response 3, the matching response is preferred (220), provided the timestamp difference is within a 15-minute threshold. This rule ensures that the most recent and consistent data is prioritized, further enhancing the reliability of the deployment decision.

In cases where none of the three responses agree, and the timestamp of response 3 is more than ten minutes old, the IntelliModule aborts the deployment process (222). This precautionary measure prevents the use of stale or unreliable data that could lead to erroneous deployments. By applying these detailed validation rules, the IntelliModule ensures that only the most current and consistent data is used for making deployment decisions, thus significantly reducing the risk of deploying to incorrect or inappropriate servers.

The IntelliModule's decision-making capabilities are supported by its integration with the Active Nodes Registry (ANR), which is continuously updated via an encrypted 5G network. The ANR uses periodic data pulses from active radio transponders located in data centers (600, 602, 604). These transponders act as beacons, sending regular updates on server status. The data pulses are processed at the data center level (606) before being transmitted over the 5G backbone. This ensures that the data is aggregated accurately and securely. The ANR consolidates this data to provide the most current and reliable server status information (618), which is then utilized by the IntelliModule.

In addition to the ANR, the IntelliModule leverages data from the Splunk API (118), which offers insights into server activity based on traffic data. The Splunk API can execute searches, run saved macros, or process specific parameter values, providing a comprehensive view of server performance and activity levels. By integrating these multiple data sources, the IntelliModule ensures a thorough and accurate validation process.

Throughout the validation process, the IntelliModule employs secure communication channels, utilizing an encrypted tunnel over the 5G backbone (612) to protect data integrity and prevent unauthorized access. This secure communication is essential for maintaining the confidentiality and integrity of the data exchanged between the various system components.

The IntelliModule also uses structured data formats, such as JSON, for data transmission between components. This format allows for efficient data parsing and seamless integration across different parts of the deployment process. By leveraging JSON, the system can easily adapt to changes in deployment configurations and integrate with other tools and systems within the IT infrastructure.

The IntelliModule's ability to dynamically validate deployment targets in real-time, using multiple independent data sources, addresses a critical need in modern IT operations. This dynamic validation ensures that deployments are only made to appropriate servers, minimizing the risk of errors and enhancing the stability and reliability of the software delivery process. The comprehensive and secure approach employed by the IntelliModule makes it a robust and invaluable tool for managing complex deployment scenarios.

In summary, FIG. 2 provides a detailed view of the IntelliModule's validation and decision-making process. It showcases the meticulous steps and rules that ensure accurate, secure, and reliable software deployments. The integration of multiple data sources, real-time validation, and secure communication channels highlights the sophistication and robustness of the guardrail system. This system effectively addresses the critical challenges of modern software deployment and infrastructure reconfiguration, enhancing the overall reliability and security of the deployment process.

Figure 3:
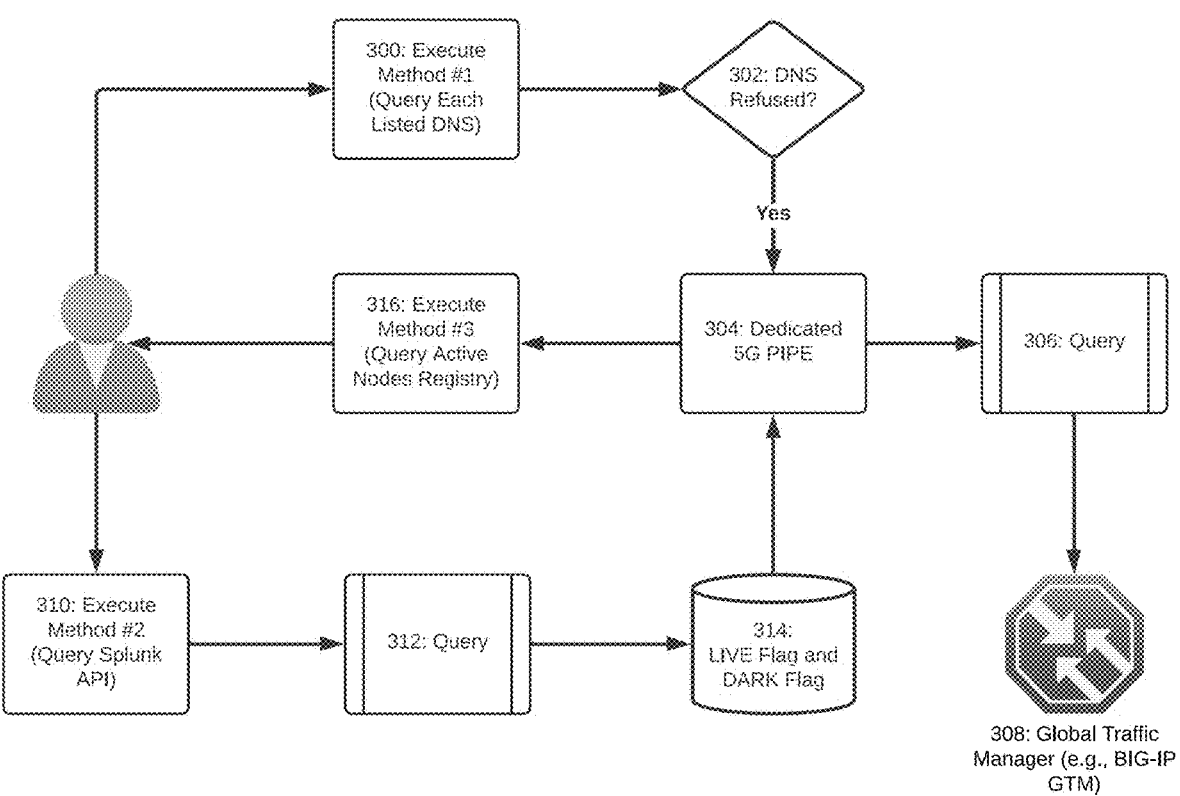
FIG. 3 depicts the Decisioning Loop for the Smart Playbook within the Ansible Tower, emphasizing the validation steps involving DNS queries, Splunk API results, and ANR data. The IntelliModule processes these inputs to validate deployment targets and mitigate the risk of deploying to incorrect servers.

In FIG. 3, the Decisioning Loop for the Smart Playbook (300) is meticulously illustrated, providing a comprehensive view of the validation methods and decision-making processes that ensure the accuracy and security of automated software deployments and infrastructure reconfiguration. The Smart Playbook is an essential component within the Ansible Tower, designed to manage and orchestrate complex deployment tasks while integrating intelligent decision-making capabilities through the IntelliModule (106).

The process initiates with Method #1 (300), which involves querying each listed DNS server to gather information about the deployment targets. The IntelliModule begins by sending DNS queries to the servers specified in the deployment configuration. These queries are executed using standard tools like 'dig' or 'nslookup' to retrieve DNS records for the application URL. This step is critical as it provides the initial set of data regarding the DNS configuration and the associated IP addresses of the servers.

If the DNS query is refused (302), indicating potential issues with the DNS server or network connectivity, the system adapts by using a dedicated 5G PIPE (304) to re-establish the connection and execute the query. This fallback mechanism ensures that network disruptions do not impede the validation process, maintaining the robustness and reliability of the system.

Once the connection is secured, the IntelliModule performs the DNS query (306) again, retrieving the necessary DNS information. This data is then processed by the Global Traffic Manager (GTM) (308), such as BIG-IP GTM, which plays a vital role in managing traffic distribution and providing comprehensive insights into traffic patterns and server status. The GTM analyzes the DNS responses and returns critical information, including the LIVE Flag and DARK Flag (314), which indicate whether the queried pods are active (live) or inactive (dark). This information forms the basis for the initial validation of the deployment targets.

After the successful completion of Method #1, the IntelliModule proceeds to Method #3 (316). This method involves querying the Active Nodes Registry (ANR) to determine the real-time status of nodes within the infrastructure. The ANR is continuously updated via an encrypted 5G network, which uses periodic data pulses sent by active radio transponders located in data centers (600, 602, 604). These transponders act as beacons, emitting regular status updates that are processed at the data center level (606) before being transmitted over the 5G backbone. This ensures that the data is aggregated accurately and securely, providing the most current and reliable information about server status (618).

Simultaneously, the IntelliModule executes Method #2 (310), which involves querying the Splunk API. The Splunk API is a powerful tool that provides insights into server activity based on real-time traffic data. The IntelliModule can run a Splunk search, execute a saved Splunk macro, or process specific parameter values to gather detailed information about server performance and activity levels. This data offers a comprehensive view of the operational state of the servers, which is essential for validating the deployment targets.

The results from all three methods—DNS queries (Method #1), traffic data from Splunk (Method #2), and node status from the ANR (Method #3)—are then compared to ensure consistency and accuracy. Method #1 provides the initial DNS-based validation, while Method #2 and Method #3 offer additional layers of validation through traffic data and real-time node status, respectively. This multi-layered approach enhances the reliability of the validation process by cross-referencing data from independent sources.

If any discrepancies are found between the methods, the IntelliModule applies predefined decision-making rules to resolve them. For example, if the DNS query from Method #1 and the Splunk API results from Method #2 agree, but the ANR data from Method #3 differs, the IntelliModule compares the timestamps of the data. If the ANR data is more recent, it takes precedence, and the system relies on it for the final decision. Conversely, if the DNS and Splunk data are newer, the ANR data is discarded, and the decision is based on the agreement between the first two methods.

In scenarios where the data from all three methods do not agree, and the ANR data is older than ten minutes, the deployment is aborted to prevent potential errors. This precautionary measure ensures that only the most current and reliable data guides the deployment process, mitigating the risk of deploying to incorrect servers. By applying these detailed validation rules, the IntelliModule enhances the accuracy and security of the deployment process.

Furthermore, the IntelliModule ensures secure communication throughout the validation process by utilizing an encrypted tunnel over the 5G backbone (612). This secure communication channel protects data integrity and prevents unauthorized access, maintaining the confidentiality and reliability of the data exchanged between the system components.

The system's flexibility and scalability are enhanced by using structured data formats, such as JSON, for data transmission between components. This format allows for efficient data parsing and seamless integration across different parts of the deployment process, facilitating smooth communication and data exchange. By leveraging JSON, the system can easily adapt to changes in deployment configurations and integrate with other tools and systems within the IT infrastructure.

Overall, FIG. 3 provides a detailed and expanded view of the Decisioning Loop for the Smart Playbook, showcasing the multi-layered validation methods and decision-making rules that ensure accurate, secure, and reliable software deployments. The integration of DNS queries, traffic data from Splunk, and real-time node status from the ANR highlights the sophistication and robustness of the guardrail system. This system effectively addresses the critical challenges of modern software deployment and infrastructure reconfiguration, enhancing the overall reliability and security of the deployment process.

Figure 4:
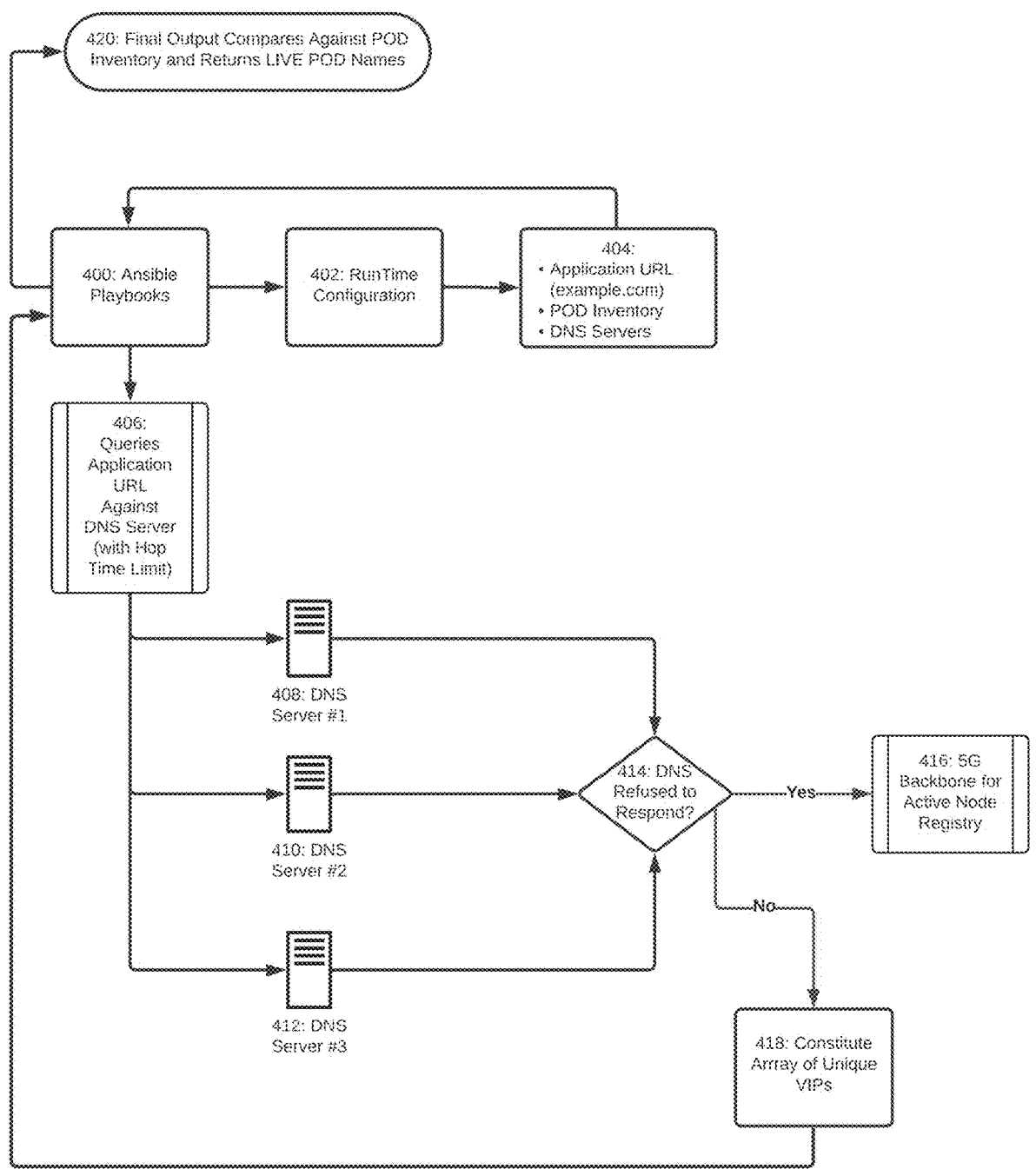
FIG. 4 provides a detailed view of the DNS resolution process for active POD identification, demonstrating how the system retrieves, processes, and validates DNS information to ensure accurate deployment environments. The IntelliModule integrates DNS data with real-time updates from the ANR and Splunk API to verify deployment targets.

In FIG. 4, the detailed process of DNS resolution for active POD identification within the guardrail system for automated software deployment and infrastructure reconfiguration is presented, showcasing a meticulous approach to ensure accurate and secure deployments. The process begins with the Ansible Playbooks (400), which are part of the deployment orchestration framework, providing a structured set of instructions for executing deployment tasks. These playbooks are loaded with the RunTime Configuration (402), which includes essential parameters such as the application URL, the inventory of PODs, and the list of DNS servers that need to be queried.

The deployment process is initiated by querying the application URL (404), for instance, example.com, against multiple DNS servers (408, 410, 412). The IntelliModule (106) executes 'dig' or 'nslookup' commands to retrieve DNS information for the specified URL. This initial step is crucial as it gathers the necessary data to understand the DNS configuration and the IP addresses associated with the application URL. The system incorporates a hop time limit (406) to ensure that the DNS queries are performed efficiently within a specified timeframe, avoiding delays and ensuring timely data retrieval.

As the DNS queries are executed, responses are obtained from several DNS servers to ensure comprehensive coverage and validation. DNS Server #1 (408), DNS Server #2 (410), and DNS Server #3 (412) provide their respective responses. These responses are analyzed to determine the status of the servers. If any DNS server refuses to respond (414), indicating a potential issue with the server or network connectivity, the system adapts by utilizing a dedicated 5G PIPE (416) to re-establish the connection and execute the query. This fallback mechanism ensures that network disruptions do not hinder the validation process, maintaining the robustness and reliability of the system.

The retrieved DNS responses are then processed to identify unique Virtual IPs (VIPs). The IntelliModule compiles these VIPs into an array (418), representing the current view of the DNS configuration. This step is essential for forming a comprehensive and accurate list of active servers based on the latest DNS data. The compiled array includes the IP addresses and associated PODs that are currently active.

The final output (420) involves comparing the compiled array of VIPs against the POD inventory to determine which PODs are live. The IntelliModule performs this comparison by examining the names of the deployment environments (variable 'dep_env') against the identified VIPs. This string comparison ensures that only the appropriate, non-live environments are targeted for deployment, thereby preventing any accidental disruptions to active services. This step is critical in ensuring that deployments do not inadvertently impact live servers, maintaining the integrity and availability of the production environment.

In addition to DNS-based validation, the IntelliModule integrates data from the Active Nodes Registry (ANR) and the Splunk API to enhance the accuracy and reliability of the deployment process. The ANR provides real-time status updates of nodes within the infrastructure, utilizing periodic data pulses sent by active radio transponders from servers within data centers. These transponders (600, 602, 604) act as beacons, sending regular updates on server status. The data pulses are processed at the data center level (606) before being transmitted over the encrypted 5G backbone (612). This ensures that the data is aggregated accurately and securely, providing the most current and reliable information about server status (618).

The IntelliModule consolidates the data from the ANR to offer a unified status report. This consolidation process involves aggregating the processed data pulses to create a comprehensive view of the server status. This real-time information is crucial for validating the deployment targets, ensuring that only appropriate servers are included in the deployment process.

Simultaneously, the IntelliModule queries the Splunk API to gain insights into server activity based on real-time traffic data. The Splunk API can execute searches, run saved macros, or process specific parameter values, providing a detailed view of server performance and activity levels. This data is critical for cross-referencing with the DNS responses and the ANR data to ensure consistency and accuracy. The IntelliModule uses the Splunk API results to validate the current operational state of the servers, ensuring that they are suitable for deployment.

The IntelliModule applies predefined decision-making rules to resolve any discrepancies between the data sources. For instance, if the DNS responses and the Splunk API results agree but differ from the ANR data, the IntelliModule evaluates the timestamps of the data. If the ANR data is more recent, it takes precedence, and the system relies on it for the final decision. Conversely, if the DNS and Splunk data are newer, the ANR data is discarded, and the decision is based on the agreement between the first two methods. These rules ensure that the most current and reliable data guides the deployment process.

In scenarios where the data from all three methods do not agree, and the ANR data is older than ten minutes, the IntelliModule aborts the deployment to prevent potential errors. This precautionary measure ensures that only the most up-to-date and consistent data is used for making deployment decisions, significantly reducing the risk of deploying to incorrect servers.

To maintain the security and integrity of the data exchanged between system components, the IntelliModule utilizes secure communication channels. By leveraging an encrypted tunnel over the 5G backbone, the system protects against unauthorized access and ensures the confidentiality and reliability of the deployment process.

The system's flexibility and scalability are further enhanced by using structured data formats, such as JSON, for data transmission between components. This format allows for efficient data parsing and seamless integration across different parts of the deployment process. By leveraging JSON, the system can easily adapt to changes in deployment configurations and integrate with other tools and systems within the IT infrastructure.

Overall, FIG. 4 provides an expanded and detailed view of the DNS resolution process for active POD identification within the guardrail system. The integration of multiple data sources, including DNS responses, ANR data, and Splunk API results, along with sophisticated decision-making rules, highlights the system's robustness and sophistication. This comprehensive approach effectively addresses the critical challenges of modern software deployment and infrastructure reconfiguration, ensuring accurate, secure, and reliable deployments.

Figure 5:
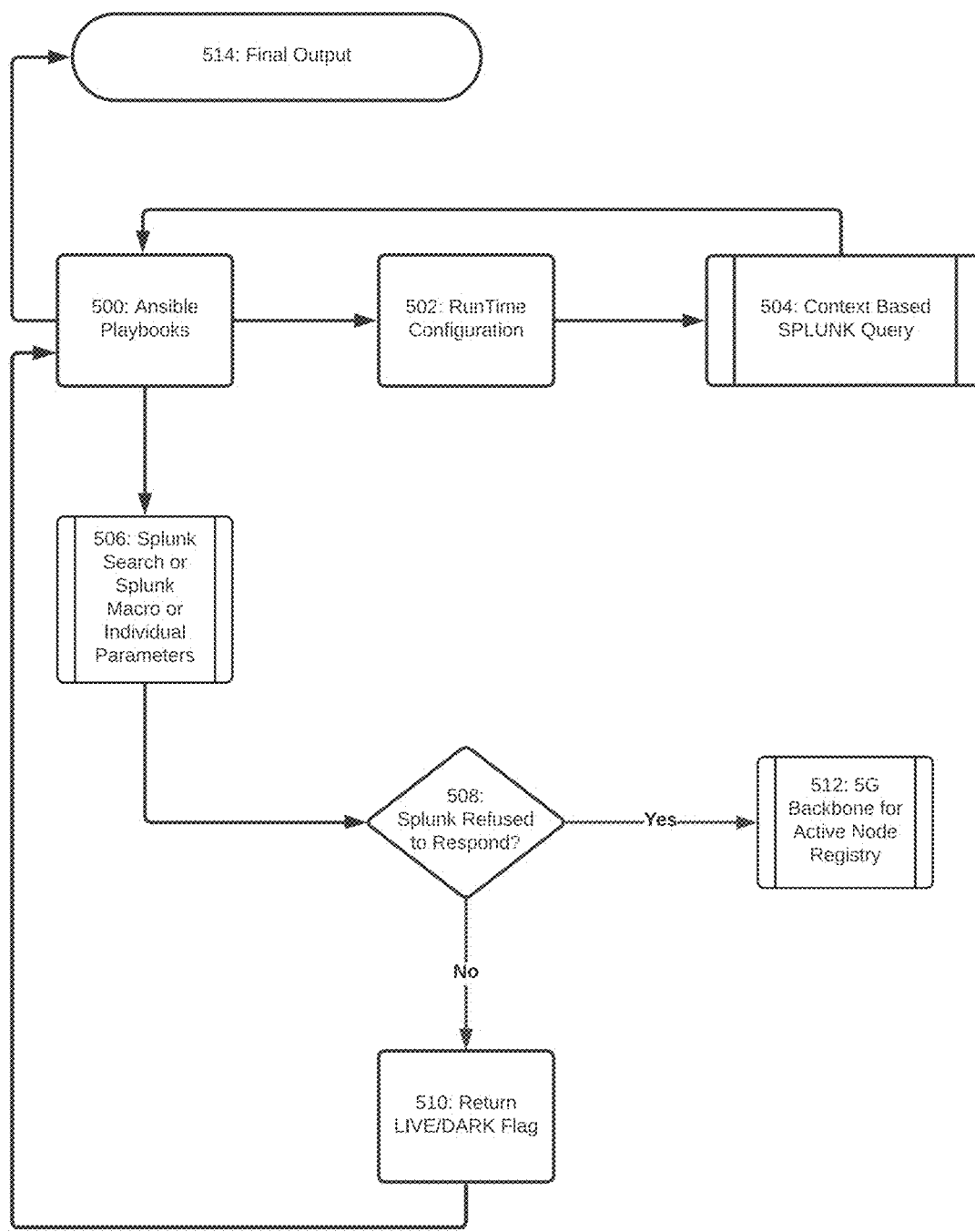
FIG. 5 illustrates the use of the Splunk API to identify active PODs, showing how the IntelliModule queries Splunk for real-time traffic data and integrates this information with the ANR data for validation. The system ensures reliable and secure deployments by cross-referencing traffic data with other validation sources.

In FIG. 5, the detailed methodology for utilizing the Splunk API to identify active PODs within the guardrail system for automated software deployment and infrastructure reconfiguration is depicted. This figure illustrates how the system leverages Splunk's capabilities to validate deployment targets based on real-time traffic data, ensuring that deployments are conducted accurately and securely.

The process begins with the Ansible Playbooks (500), which serve as the foundational framework for orchestrating deployment tasks. These playbooks contain detailed instructions and logical sequences required to manage complex deployment operations. At the core of this process is the RunTime Configuration (502), which is loaded with essential parameters, including the application context, environmental details, and Splunk query configurations necessary for the deployment validation.

To initiate the Splunk-based validation, the IntelliModule (106) executes a context-based Splunk query (504). This query can be performed using one of three distinct methods: running a direct Splunk search, executing a saved Splunk macro, or passing specific values to individual parameters within the Splunk API. The choice of method depends on the deployment's specific requirements and the nature of the data needed for validation.

When the direct Splunk search method is employed, the IntelliModule sends a predefined search string to the Splunk API, which processes the request and returns relevant traffic data. This data provides critical insights into the server's activity levels, including metrics such as traffic volume, error rates, and response times. These metrics are essential for determining whether the servers are currently handling live traffic or are in a dark state, thereby facilitating accurate deployment decisions.

If the saved Splunk macro method is utilized, the IntelliModule invokes a predefined macro within Splunk. This macro encapsulates complex search logic and is executed by the Splunk API, which returns aggregated results based on the parameters defined within the macro. This approach allows for more sophisticated and reusable queries, tailored to meet specific validation requirements. The results from the saved macro provide a comprehensive view of the server's performance and activity levels.

In the third method, individual parameters are passed to the Splunk API (506), allowing for fine-grained control over the search criteria. The IntelliModule sends specific values, such as index names, search strings, and evaluation conditions, to the Splunk API. The API processes these parameters and returns the corresponding data, which is critical for the granular validation of deployment targets. This method is particularly useful for tailoring the validation process to real-time operational requirements.

The Splunk API results provide detailed insights into the server's operational status. The IntelliModule processes this data to determine whether the deployment environment is live or dark. If the Splunk API refuses to respond (508), indicating potential connectivity issues or misconfigurations, the system adapts by switching to a dedicated 5G PIPE (512). This ensures reliable and secure data transmission, maintaining the robustness of the validation process despite network challenges.

In addition to the Splunk API results, the IntelliModule integrates data from the Active Nodes Registry (ANR). The ANR offers real-time updates on node status via periodic data pulses sent by active radio transponders located in data centers. These transponders emit regular status updates, which are processed and aggregated at the data center level before being transmitted over the encrypted 5G backbone. This ensures that the ANR provides the most current and reliable information about server status, crucial for validating the deployment targets.

The IntelliModule then performs a final comparison (514) between the Splunk API results and the ANR data to ensure consistency and accuracy. The IntelliModule applies pre-defined decision-making rules to resolve any discrepancies between these data sources. For instance, if the Splunk API results indicate that a server is handling live traffic, but the ANR data shows it as dark, the IntelliModule evaluates the timestamps and consistency of the data. If the ANR data is more recent, it takes precedence; otherwise, the Splunk data is prioritized. This decision-making process ensures that only the most reliable and current data guide the deployment decisions.

Throughout this process, the IntelliModule ensures secure communication by utilizing an encrypted tunnel over the 5G backbone. This secure channel protects data integrity and prevents unauthorized access, maintaining the confidentiality and reliability of the data exchanged between system components.

The system's flexibility and scalability are enhanced by using structured data formats, such as JSON, for data transmission between components. This format allows for efficient data parsing and seamless integration across different parts of the deployment process. By leveraging JSON, the system can easily adapt to changes in deployment configurations and integrate with other tools and systems within the IT infrastructure.

Overall, FIG. 5 provides an expanded and detailed view of the Splunk-based methodology for active POD identification within the guardrail system. The integration of real-time traffic data from Splunk, combined with the ANR's node status updates and sophisticated decision-making rules, highlights the system's robustness and sophistication. This comprehensive approach effectively addresses the critical challenges of modern software deployment and infrastructure reconfiguration, ensuring accurate, secure, and reliable deployments.

In more detail, the Ansible Playbooks (500) within the system initiate the sequence of operations required for deployment. These playbooks, integral to the orchestration framework, load the RunTime Configuration (502), which includes critical deployment parameters. These parameters encompass the application URL, POD inventory, and a list of DNS servers. The IntelliModule (106) is the engine that drives the deployment validation process by leveraging Splunk's capabilities.

The first step involves executing context-based Splunk queries (504). When running a direct Splunk search, the IntelliModule sends a search string designed to retrieve specific traffic data. For example, the search string might request data on the number of incoming connections or error rates over a defined period. This data provides a snapshot of server activity, helping to determine if the servers are currently live.

If using a saved Splunk macro, the IntelliModule calls a predefined macro within Splunk. This macro could encapsulate complex logic to aggregate data over multiple indices and time frames, providing a broader view of server health and activity. The macro might, for instance, calculate the average response time across different application end-points, offering insights into performance trends that can affect deployment decisions.

When passing individual parameters to the Splunk API (506), the IntelliModule specifies detailed criteria such as index names, search strings, and evaluation conditions. This granular approach allows the system to fine-tune the data retrieval process, ensuring that the most relevant and current data is used for validation. Parameters could include specific error codes, response times, and traffic volumes, which are critical for assessing the readiness of the deployment environment.

The results from these Splunk API calls provide a comprehensive view of server activity and performance. The IntelliModule processes this data to determine whether the servers are live or dark. If the Splunk API refuses to respond (508), indicating potential connectivity issues or misconfigurations, the system seamlessly switches to using a dedicated 5G PIPE (512). This fallback mechanism ensures that data transmission remains reliable and secure, mitigating the risk of deployment errors due to network issues.

The Active Nodes Registry (ANR) (510) complements the Splunk API data by providing real-time updates on node status. Active radio transponders (514) within data centers send periodic data pulses containing status information. These pulses are processed and aggregated at the data center level before being transmitted over the encrypted 5G backbone. This real-time data is crucial for maintaining an up-to-date view of server status.

The IntelliModule then compares the Splunk API results with the ANR data (516) to ensure consistency and accuracy. Predefined decision-making rules are applied to resolve any discrepancies. For example, if the Splunk data indicates live traffic while the ANR data shows the server as dark, the IntelliModule evaluates the timestamps and consistency of both data sources. If the ANR data is more recent, it takes precedence; otherwise, the Splunk data is prioritized. This process ensures that deployment decisions are based on the most reliable and current data available.

Throughout this process, secure communication is maintained using an encrypted tunnel over the 5G backbone. This secure channel protects data integrity and prevents unauthorized access, ensuring that the data exchanged between system components remains confidential and reliable.

The use of structured data formats, such as JSON, for data transmission between components enhances the system's flexibility and scalability. This format allows for efficient data parsing and seamless integration across different parts of the deployment process. By leveraging JSON, the system can easily adapt to changes in deployment configurations and integrate with other tools and systems within the IT infrastructure.

Overall, FIG. 5 provides a detailed and expanded view of the Splunk-based methodology for active POD identification within the guardrail system. The integration of real-time traffic data from Splunk, combined with the ANR's node status updates and sophisticated decision-making rules, highlights the system's robustness and sophistication. This comprehensive approach effectively addresses the critical challenges of modern software deployment and infrastructure reconfiguration, ensuring accurate, secure, and reliable deployments.

Figure 6:
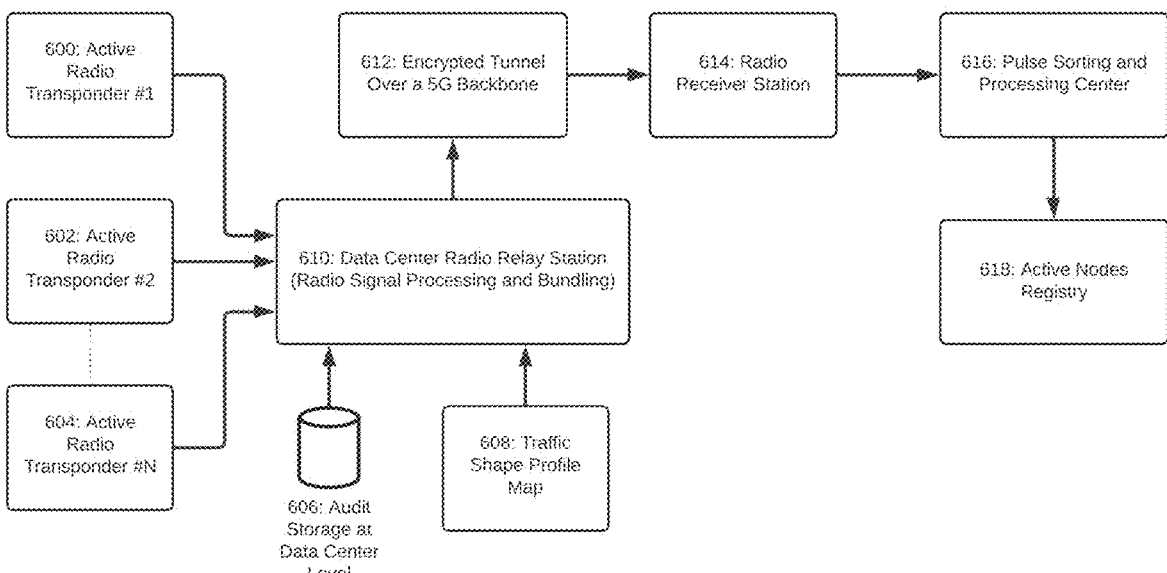
FIG. 6 outlines the secure architecture of the encrypted tunnel over a 5G backbone, which facilitates the real-time and reliable transmission of server status updates to the ANR. The process includes data collection by active radio transponders, encryption, transmission over 5G, and decryption before integration into the ANR.

In FIG. 6, the intricate and secure architecture of the encrypted tunnel over a 5G backbone, essential for maintaining the Active Nodes Registry (ANR) within the guardrail system for automated software deployment and infrastructure reconfiguration, is depicted with remarkable detail. This figure provides a comprehensive overview of the sophisticated communication network that ensures real-time, reliable, and secure updates to the ANR, which is critical for validating deployment targets and maintaining accurate server status information.

The process begins with the active radio transponders situated at various data centers. These transponders, illustrated as Active Radio Transponder #1 (600), Active Radio Transponder #2 (602), and Active Radio Transponder #N (604), are vital components continuously monitoring and reporting the status of the servers. These transponders emit periodic data pulses containing crucial status information about the servers, including their operational state, traffic loads, and performance metrics.

These data pulses are initially captured and processed at the data center level (606). The processing involves aggregating and analyzing the raw data from multiple transponders to create a cohesive and accurate status report. This processing center ensures the data is clean, consistent, and ready for secure transmission. Each transponder's data is meticulously checked and verified to ensure no discrepancies exist, which could compromise the integrity of the ANR. The data center processing involves complex algorithms and checks to validate the accuracy of the data before transmission.

Once the data is processed, it is transmitted via the data center radio relay station (610). This relay station plays a crucial role in bundling and securely transmitting the data pulses. At this stage, the data is encrypted to ensure it remains confidential and protected from unauthorized access during transmission. The encryption process involves sophisticated algorithms that scramble the data, making it unreadable to anyone without the correct decryption key. This step is vital for protecting sensitive information about server statuses and operations.

The encrypted data is then sent through an encrypted tunnel over the 5G backbone (612). This backbone is a high-speed, low-latency network that provides a robust and secure channel for data transmission. The use of 5G technology ensures the data can be transmitted rapidly and reliably, maintaining the real-time nature of the updates to the ANR. The 5G backbone is designed to handle large volumes of data with minimal delay, ensuring the status information is always current and accurate. The technology behind the 5G network ensures optimal performance and reliability, crucial for real-time data updates At the receiving end, the data reaches the radio receiver station (614). This station is responsible for decrypting the data and ensuring it is intact and unaltered. The decryption process is as crucial as encryption, ensuring that data integrity is maintained and that the data received is accurate and usable. The decrypted data is then forwarded to the pulse sorting and processing center (616). This center further processes the data, sorting it according to predefined criteria and preparing it for integration into the ANR. This step involves organizing the data into a format that can be easily accessed and interpreted by the IntelliModule and other system components.

The Active Nodes Registry (ANR) (618) consolidates the received data to provide a comprehensive and up-to-date view of the server status across all data centers. The ANR acts as a central repository that stores the status information and makes it accessible to the IntelliModule for deployment validation. This registry is crucial for maintaining the accuracy and reliability of the deployment process, ensuring only the appropriate servers are targeted. The ANR continuously updates its records, reflecting any changes in server status, such as servers going offline or coming online. This dynamic updating process ensures that the most recent data is always available for decision-making.

The entire communication process is secured by the encrypted tunnel over the 5G backbone, which protects the integrity and confidentiality of the data during transmission. This secure communication channel is essential for preventing unauthorized access and ensuring the data remains reliable and trustworthy. The encryption and decryption processes are designed to be seamless, ensuring the data flows smoothly through the system without interruptions. This security measure is critical in protecting the system from potential cyber threats and ensuring that sensitive data about server statuses is not compromised.

Additionally, the system uses a dedicated 5G network to isolate the ANR updates from the primary network, further enhancing security and reliability. This isolation ensures the updates to the ANR are not affected by potential issues or attacks on the primary network, maintaining the robustness of the system. The dedicated network provides an additional layer of security, ensuring the ANR data remains protected even in the event of a primary network failure. This redundancy is crucial for maintaining the continuous operation and reliability of the ANR.

The use of structured data formats, such as JSON, for data transmission between components ensures efficient data parsing and seamless integration across different parts of the deployment process. This format allows the system to adapt to changes in deployment configurations and integrate with other tools and systems within the IT infrastructure. By leveraging JSON, the system can easily exchange data between components, ensuring all parts of the system are synchronized and working together effectively. JSON's flexibility and efficiency make it an ideal choice for real-time data transmission and processing in complex systems.

Overall, FIG. 6 provides an expanded and detailed view of the secure architecture for maintaining the ANR within the guardrail system. The integration of active radio transponders, data processing centers, encrypted tunnels, and the 5G backbone highlights the system's sophistication and robustness. This comprehensive approach effectively addresses the critical challenges of modern software deployment and infrastructure reconfiguration, ensuring accurate, secure, and reliable deployments. The detailed processes and secure communication channels depicted in FIG. 6 underscore the importance of maintaining real-time, reliable updates to the ANR, which is vital for the overall integrity and success of the deployment process. This architecture ensures that the deployment system can operate efficiently and securely in dynamic and potentially hostile environments, making it a critical component of modern IT infrastructure.

In FIG. 7, the sophisticated integration and operation of the Active Nodes Registry (ANR) within the guardrail system for automated software deployment and infrastructure reconfiguration are depicted with great detail, showcasing the interaction between various system components and the flow of data through the network. The figure highlights the processes that ensure real-time, reliable, and secure updates to the ANR, which is critical for validating deployment targets and maintaining accurate server status information.

The process begins with the active radio transponders located at various data centers. These transponders, illustrated as Active Radio Transponder #1 (700), Active Radio Transponder #2 (702), and Active Radio Transponder #N (704), continuously monitor the status of servers and emit periodic data pulses. Each transponder collects vital status information, including operational state, traffic loads, performance metrics, and any detected anomalies. This constant monitoring ensures that the ANR is always updated with the latest server status information.

These data pulses are first captured and processed at the data center level (706). During this initial processing phase, raw data from multiple transponders is aggregated and analyzed to create a coherent and accurate status report. The processing center ensures that the data is validated, cleaned, and consolidated before transmission. This involves running complex algorithms and checks to verify the accuracy and consistency of the data. The processed data is then prepared for secure transmission, ensuring that it is in a format suitable for encryption and relay.

Once the data is processed, it is transmitted via the data center radio relay station (708). This relay station plays a crucial role in bundling the data pulses and securely transmitting them. The data is encrypted at this stage to ensure confidentiality and protection from unauthorized access during transmission. The encryption process employs advanced cryptographic algorithms to scramble the data, making it unreadable without the correct decryption key. This step is vital for protecting sensitive information about server statuses and operations from potential cyber threats.

The encrypted data is then sent through an encrypted tunnel over the 5G backbone (710). The 5G backbone is a high-speed, low-latency network that provides a robust and secure channel for data transmission. The use of 5G technology ensures rapid and reliable data transmission, maintaining the real-time nature of the updates to the ANR. The 5G network is designed to handle large volumes of data with minimal delay, ensuring that the status information remains current and accurate. The technology behind the 5G network ensures optimal performance and reliability, crucial for real-time data updates.

At the receiving end, the data reaches the radio receiver station (712). This station is responsible for decrypting the data and ensuring its integrity to confirm that it has not been altered during transmission. The decrypted data is then forwarded to the pulse sorting and processing center (714), where it undergoes further processing. This center sorts the data according to predefined criteria, ensuring it is organized and ready for integration into the ANR. This step involves organizing the data into a format that can be easily accessed and interpreted by the IntelliModule and other system components.

The Active Nodes Registry (ANR) (716) consolidates the processed data to provide a comprehensive and up-to-date view of the server status across all data centers. The ANR acts as a central repository, storing the status information and making it accessible to the IntelliModule (106) for deployment validation. This registry is critical for maintaining the accuracy and reliability of the deployment process, ensuring that only the appropriate servers are targeted for deployment. The ANR continuously updates its records, reflecting any changes in server status, such as servers going offline or coming online. This dynamic updating process ensures that the most recent data is always available for decision-making.

The IntelliModule (106) plays a crucial role in utilizing the data from the ANR for deployment validation. It applies predefined decision-making rules to the ANR data to determine the validity of deployment targets. For example, if the ANR data shows that a server is currently live, the IntelliModule can cross-reference this information with data from other sources, such as the Splunk API and DNS queries, to ensure consistency and accuracy. This multi-faceted validation process mitigates the risk of deploying to incorrect servers, enhancing the reliability and security of the deployment process.

Throughout this process, secure communication is maintained using the encrypted tunnel over the 5G backbone (710). This secure channel protects data integrity and prevents unauthorized access, ensuring that the data exchanged between system components remains confidential and reliable. The encryption and decryption processes are seamless, allowing data to flow smoothly through the system without interruptions. This security measure is essential for protecting the system from potential cyber threats and ensuring that sensitive server status data is not compromised.

Additionally, the system uses a dedicated 5G network to isolate the ANR updates from the primary network, further enhancing security and reliability. This isolation ensures that the updates to the ANR are not affected by potential issues or attacks on the primary network, maintaining the robustness of the system. The dedicated network provides an additional layer of security, ensuring the ANR data remains protected even in the event of a primary network failure. This redundancy is crucial for maintaining the continuous operation and reliability of the ANR.

The use of structured data formats, such as JSON, for data transmission between components ensures efficient data parsing and seamless integration across different parts of the deployment process. This format allows the system to adapt to changes in deployment configurations and integrate with other tools and systems within the IT infrastructure. By leveraging JSON, the system can easily exchange data between components, ensuring all parts of the system are synchronized and working together effectively. JSON's flexibility and efficiency make it an ideal choice for real-time data transmission and processing in complex systems.

The IntelliModule further validates deployment targets by comparing ANR data with real-time traffic data obtained from the Splunk API. The Splunk API provides detailed insights into server activity, including metrics such as traffic volume, error rates, and response times. These metrics are essential for determining whether the servers are currently handling live traffic or are in a dark state. If discrepancies are found between the ANR data and the Splunk API results, the IntelliModule applies predefined decision-making rules to resolve them. For instance, if the ANR data is more recent than the Splunk data, it takes precedence; otherwise, the Splunk data is prioritized.

The final decision to proceed with the deployment is based on the comprehensive validation of data from multiple sources, including the ANR, Splunk API, and DNS queries. This multi-layered validation process ensures that only the most reliable and current data guide the deployment decisions, significantly reducing the risk of errors and enhancing the overall security of the deployment process.

Overall, FIG. 7 provides an expanded and detailed view of the integration and operation of the ANR within the guardrail system. The integration of active radio transponders, data processing centers, encrypted tunnels, and the 5G backbone highlights the system's sophistication and robustness. This comprehensive approach effectively addresses the critical challenges of modern software deployment and infrastructure reconfiguration, ensuring accurate, secure, and reliable deployments. The detailed processes and secure communication channels depicted in FIG. 7 underscore the importance of maintaining real-time, reliable updates to the ANR, which is vital for the overall integrity and success of the deployment process. This architecture ensures that the deployment system can operate efficiently and securely in dynamic and potentially hostile environments, making it a critical component of modern IT infrastructure.

The DNS Resolver for Active POD Identification is a sophisticated system designed to ascertain whether a target environment is live or dark by leveraging DNS resolution results. This functionality is critical for ensuring that deployments do not inadvertently occur in active production environments, thus avoiding potential service disruptions. The system is compatible with both Windows and Linux operating systems, providing flexibility across different deployment scenarios.

The process begins with the execution of 'dig' or 'nslookup' commands from the tower host on the application URL provided as the first input. These commands retrieve DNS information for the specified URL, which is crucial for understanding the current state of the DNS entries associated with the application. Once the DNS information is obtained, it is compared against a second input, known as 'pods'. The 'pods' input consists of a comma-separated string that lists the current DNS entries and their corresponding PODs. This comparison helps to identify any live PODs that might be associated with the application URL.

In addition to the initial DNS query, the system performs further validation by executing 'dig' commands on the application URL against each DNS provided in the third input. This input, referred to as 'dnss', consists of a semi-colon separated string listing the DNS entries for the component or application. By querying each DNS server listed in 'dnss', the system can identify additional live PODs that may not have been captured in the initial query. Each live POD identified through this process is added to an array, creating a comprehensive list of active PODs.

Once the array of live PODs is compiled, the system performs a final check to determine if the name of the deployment environment, which is passed to the playbook as a variable named 'dep_env', contains any of the live PODs identified. This check is conducted through a string comparison, ensuring that the deployment environment name does not match any of the live PODs in the array. If a match is found, indicating that the deployment is targeting a live environment, the system aborts the deployment process and generates an error. This safeguard is crucial for preventing disruptions to live services.

In this system, the 'url' parameter is a string representing the URL for the component or application being deployed. The 'pods' parameter is a comma-separated string listing the current DNS entries and their corresponding PODs. The 'dnss' parameter is a semi-colon separated string listing the DNS entries for the component or application. These parameters are integral to the functioning of the DNS Resolver, providing the necessary inputs for DNS queries and comparisons.

The SPLUNK API for Active POD Identification is another key component of the system, designed to determine if a target environment is live or dark based on results from a Splunk search. Similar to the DNS Resolver, this functionality is vital for ensuring that deployments do not occur in active environments, thereby preventing potential disruptions. The SPLUNK API operates on both Windows and Linux systems and can be executed using one of three methods: running a Splunk search, running a Splunk macro (saved search), or passing values to individual parameters. Only one method can be used at a time during the deployment process.

If the macro method is employed, the 'macro_name' parameter is required. This parameter specifies the name of the saved macro in Splunk, which encapsulates a predefined search logic. If the Splunk search method is used, the 'splunk_search' parameter is required. This parameter consists of the search string to be run through the API, defining the criteria for retrieving traffic data and other metrics from Splunk. When using the parameter method, the 'index_name' parameter is required. This parameter specifies the index name for the search, allowing for granular control over the data retrieval process.

Sample values for these parameters might include 'macro_ name': "TestApp_macro", 'splunk_search': "index=TestAppleval HIGH_TRAFFIC=if (count>100, ENVIRONMENT+'TRUE', 'FALSE')", and 'index_name': "TestApp_index". These values illustrate how the parameters can be configured to tailor the SPLUNK API calls to specific deployment scenarios.

The SPLUNK API retrieves detailed insights into server activity, including metrics such as traffic volume, error rates, and response times. These metrics are essential for determining whether the servers are currently handling live traffic or are in a dark state. The data obtained from Splunk is then used to validate the deployment targets, ensuring that deployments are only directed to appropriate servers.

By integrating the DNS Resolver and SPLUNK API functionalities, the system provides a robust and comprehensive approach to active POD identification. These procedures and parameters ensure that the system can reliably identify whether the deployment environment is suitable for deployment, thereby preventing disruptions by avoiding live environments. The multi-faceted validation process, leveraging both DNS and Splunk data, enhances the accuracy and reliability of the deployment decisions, ensuring that deployments are conducted securely and without impacting live services.

Figure 8:
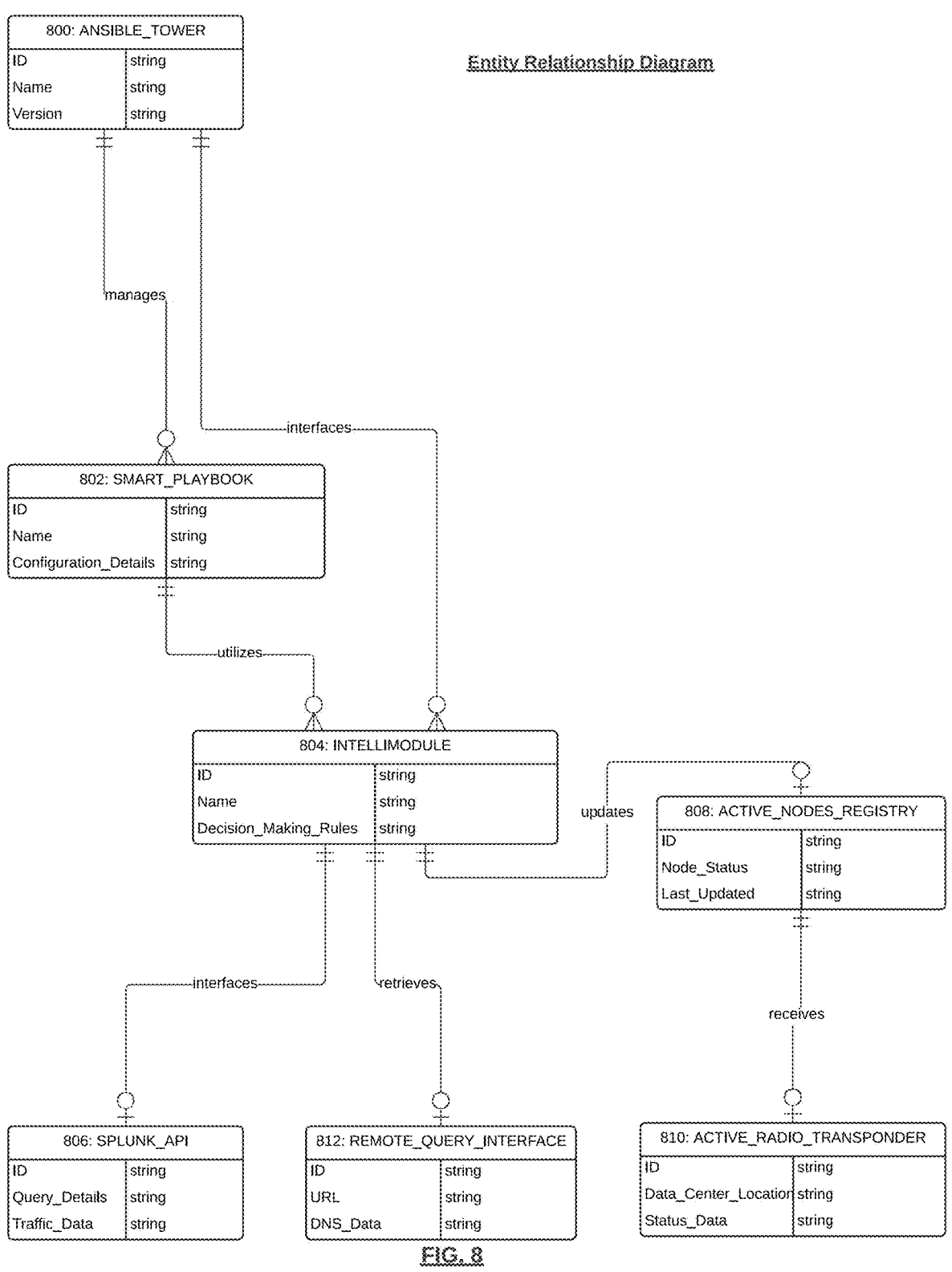
FIG. 8 illustrates an Entity-Relationship Diagram showcasing the relationships and attributes of the key components such as Ansible Tower, Smart Playbook, IntelliModule, Remote Query Interface, Splunk API, Active Nodes Registry, and Active Radio Transponders. This diagram highlights the interconnected processes that ensure accurate, secure, and reliable automated software deployments in complex IT environments.

In FIG. 8, a sample Entity-Relationship Diagram (ERD) is depicted and provides an intricate view of the relationships and attributes of the key components that form the backbone of this sophisticated system. At the heart of the diagram is the "Ansible Tower" (800), which plays a crucial role in orchestrating and managing deployment processes. The Ansible Tower entity is characterized by three primary attributes: ID, Name, and Version, all represented as strings. These attributes uniquely identify and describe each instance of the Ansible Tower within the system.

Ansible Tower's primary responsibility is to manage the "Smart Playbooks" (802). Each Smart Playbook is also defined by a set of attributes including ID, Name, and Configuration Details, which are strings. The Smart Playbooks are comprehensive guides that contain detailed instructions and configurations necessary for executing deployment tasks. These playbooks ensure that deployments are carried out consistently and accurately according to predefined procedures.

Integral to the system's functionality is the "IntelliModule" (804), which is a sophisticated decision-making engine designed to enhance traditional deployment tools such as Ansible. The IntelliModule has attributes including ID, Name, and Decision-Making Rules. These attributes not only identify the IntelliModule but also define the rules and logic it uses to make informed decisions. The IntelliModule interfaces with both Ansible Tower and the Smart Playbooks, leveraging their capabilities to dynamically validate deployment targets in real-time.

The IntelliModule retrieves critical data from the "Remote Query Interface (RQI)" (812). The RQI is essential for gathering DNS information about deployment targets and is characterized by attributes such as ID, URL, and DNS Data. By executing 'dig' or 'nslookup' commands on the application URL, the RQI provides the IntelliModule with up-to-date DNS configurations, which are crucial for determining the IP addresses associated with the application URL.

Additionally, the IntelliModule interfaces with the "Splunk API" (806), which plays a vital role in validating the live or dark status of servers based on real-time traffic data. The Splunk API's attributes include ID, Query Details, and Traffic Data. By running Splunk searches, executing saved Splunk macros, or processing specific parameters, the IntelliModule can obtain detailed insights into server performance and activity levels. This integration with Splunk allows the IntelliModule to cross-reference DNS data with real-time traffic information, enhancing the accuracy of deployment decisions.

The IntelliModule also updates the "Active Nodes Registry (ANR)" (808), which is the definitive source of truth for server status within the system. The ANR is continuously updated through an encrypted 5G network, ensuring its independence from the primary network. This independence is critical for maintaining accurate and reliable data, especially during network disruptions or cyber-attacks. The ANR's attributes include ID, Node Status, and Last Updated, which provide a comprehensive view of the server status at any given time.

Supporting the ANR are "Active Radio Transponders" (810), which are deployed within data centers to send periodic data pulses. These transponders have attributes such as ID, Data Center Location, and Status Data. The data pulses from the transponders are processed and aggregated at the data center level before being transmitted to the ANR over the encrypted 5G backbone. This setup ensures that the ANR receives the most current and reliable data, which is crucial for the IntelliModule's decision-making process.

The relationships between these entities are intricate and essential for the system's operation. Ansible Tower manages the Smart Playbooks, which are utilized by the IntelliModule. The IntelliModule retrieves data from the Remote Query Interface, interfaces with the Splunk API for real-time traffic data, and updates the Active Nodes Registry with the latest server status information. The Active Nodes Registry, in turn, receives data from the Active Radio Transponders, ensuring that it has the most accurate and up-to-date information.

This comprehensive and detailed setup of entities and their relationships forms a robust guardrail system designed to ensure the reliability and security of automated software deployment processes in complex IT environments. By integrating multiple independent sources of data and employing secure communication channels, the system mitigates the risks associated with erroneous deployments, ensuring that only the appropriate servers are targeted for deployment. This intelligent and dynamic validation process is crucial for maintaining the stability and reliability of IT operations, particularly in environments with frequent and complex deployments.

Figures 9A, 9B:
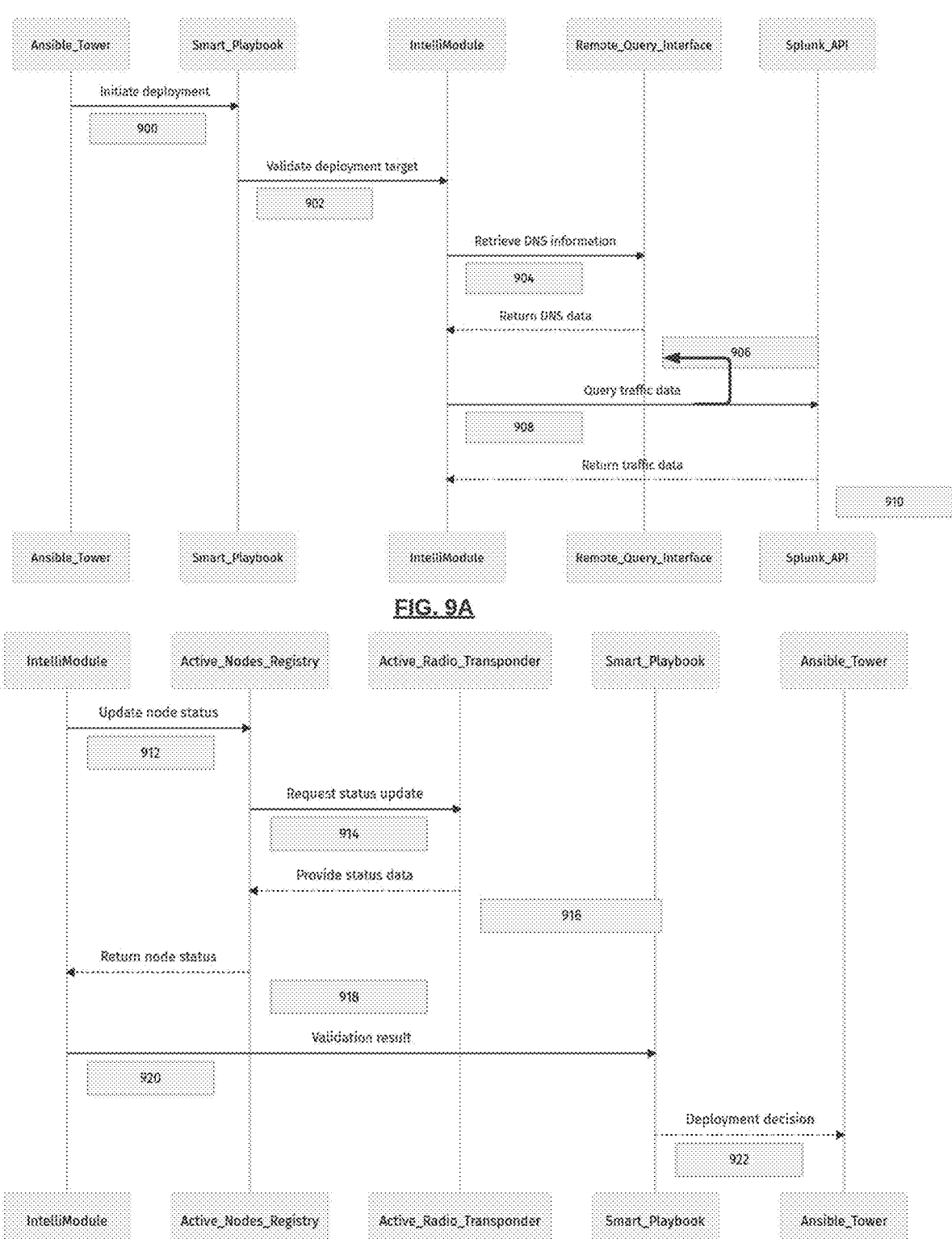
FIGS. 9A-9B are sequence diagrams that collectively illustrate sample interactions between various components of an aspect of the inventions, detailing how the Ansible Tower initiates a deployment request which is validated by the IntelliModule through a series of queries to the Remote Query Interface, Splunk API, and Active Nodes Registry. The process ensures accurate validation and updates the Ansible Tower with the deployment decision based on real-time data from multiple independent sources.

In FIGS. 9A-9B collective show a sample sequence diagram to delineate the intricate interactions among various components of one aspect of the invention.

In FIG. 9A, the sequence begins with the Ansible Tower (900), a pivotal orchestration tool responsible for managing deployment processes. The Ansible Tower initiates the deployment by sending a request to the Smart Playbook. This initial step, marked by sequence number 900, signifies the commencement of the deployment operation. The Smart Playbook (902), a detailed set of deployment instructions and logic, receives this request and subsequently directs the IntelliModule to validate the deployment target. This interaction is crucial as it sets the stage for the validation process and is denoted by sequence number 902.

The IntelliModule (904), equipped with sophisticated decision-making capabilities, begins its validation process by retrieving DNS information from the Remote Query Interface (RQI). This step involves executing specific DNS query commands such as 'dig' or 'nslookup' on the application URL to ascertain the IP addresses associated with the deployment target. The sequence number 904 highlights this critical retrieval operation. The Remote Query Interface (RQI) (906) responds by providing the DNS data back to the IntelliModule, ensuring that the module has the necessary information to proceed. This exchange is captured by sequence number 906.

Following the DNS data retrieval, the IntelliModule (908) proceeds to the next validation step by querying the Splunk API. The Splunk API is a powerful tool used to gather real-time traffic data, which is essential for understanding the operational status of the servers involved in the deployment. The interaction, marked by sequence number 908, involves the IntelliModule sending a query to the Splunk API to collect this traffic data. The Splunk API (910) then returns the requested traffic data to the IntelliModule, completing this part of the validation process with the sequence number 910. This data is crucial for the IntelliModule to cross-reference with the DNS data, ensuring that the servers are correctly identified and validated.

In FIG. 9B, the sequence continues with the IntelliModule (912) updating the node status in the Active Nodes Registry (ANR). This registry is a vital component that maintains accurate, real-time data about the server statuses within the infrastructure. The update operation, denoted by sequence number 912, ensures that the most current server status information is recorded. The Active Nodes Registry (ANR) (914) then requests a status update from the Active Radio Transponder, a component responsible for providing real-time status updates through periodic data pulses. This request, marked by sequence number 914, is essential for gathering the latest server status data.

The Active Radio Transponder (916) responds by providing the requested status data back to the Active Nodes Registry (ANR), as indicated by sequence number 916. This data transfer ensures that the ANR is updated with the most recent and reliable information. The Active Nodes Registry (ANR) (918) then returns the updated node status to the IntelliModule, a step captured by sequence number 918. This information allows the IntelliModule to complete its validation process.

Finally, the IntelliModule (920) sends the validation result to the Smart Playbook, completing the validation sequence with the number 920. The Smart Playbook (922) then informs the Ansible Tower of the deployment decision, concluding the entire deployment validation and decision-making process with the final step numbered 922. This step is critical as it determines whether the deployment will proceed based on the validated information.

The detailed sequence diagrams illustrate the multi-layered validation process involving multiple independent data sources, such as the Remote Query Interface (RQI) for DNS data, the Splunk API for traffic data, and the Active Nodes Registry (ANR) for real-time server status. Each step in the sequence is meticulously designed to ensure that the deployment targets are accurately validated, thus preventing erroneous deployments. By integrating data from these diverse sources, the IntelliModule can make informed decisions that significantly enhance the reliability and security of the deployment process. This robust validation mechanism addresses the critical need for accurate and real-time verification in complex IT environments, thereby ensuring that only the correct servers are targeted for updates and reducing the risk of deployment errors.

Regarding pseudocode, sample code is set forth below to implement one or more aspects of the invention, which involves determining whether a deployment should occur based on the status of the target environment (live or dark) using DNS resolution, Splunk API, and the Active Nodes Registry (ANR). The pseudocode also integrates decision-making rules and data validation to ensure accurate and secure deployments.

```
//Define entities and their attributes
class DNSResolver:
    String url
    String pods
    String dnss
class SplunkAPI:
    String macro_name
    String splunk_search
    String index_name
class IntelliModule:
    String decision_rules
    String validation_status
class ANR:
    String server_status_data
    String data_pulse
    String timestamp
class AnsiblePlaybooks:
    String deployment_instructions
    String runtime_configuration
class DataCenter:
    String data_processing_unit
    String radio_relay_station
class Transponder:
    String transponder_id
    String status_information
    String data_pulse_frequency
//Define relationships
class DeploymentSystem:
    DNSResolver dns_resolver
    SplunkAPI splunk_api
    IntelliModule intelli_module
    ANR anr
    AnsiblePlaybooks ansible_playbooks
    List<DataCenter> data_centers
    List<Transponder> transponders
    //Initialize the system
    def initialize_system( )
        dns_resolver=DNSResolver( )
        splunk_api=SplunkAPI( )
```

```
        intelli_module=IntelliModule( )
        anr=ANR( )
        ansible_playbooks=AnsiblePlaybooks( )
        data_centers=[ ]
        transponders=[ ]
//Method to determine live or dark status using DNS
    Resolver
def check_dns_status( ):
    run_command("dig/nslookup", dns_resolver.url)
    dns_result=retrieve_dns_info(dns_resolver-.url)
    live_pods=compare_with_pods(dns_result, dns_re-
        solver.pods)
    for dns in dns_resolver.dnss.split(';'):
        run_command("dig", dns)
        additional_live_pods=retrieve_dns_info(dns)
        live_pods.extend(additional_live_pods)
    return live_pods
//Method to determine live or dark status using Splunk
    API
def check_splunk_status( ):
    if splunk_api.macro_name:
        splunk_result=run_splunk_macro(splunk_api.ma-
            cro_name)
    elif splunk_api.splunk_search:
        splunk_result=run_splunk_search
            (splunk_api.splunk_search)
    elif splunk_api.index_name:
        splunk_result=run_splunk_index_search
            (splunk_api.index_name)
    return splunk_result
//Method to check server status using ANR
def check_anr_status( ):
    transponder_data=[ ]
    for transponder in transponders:
        data_pulse=transponder.emit_data_pulse( )
        transponder_data.append(data_pulse)
    processed_data=process_transponder_data(tran-
        sponder_data)
    anr.server_status_data=consolidate_data(processed_
        data)
    return anr.server_status_data
//Method to validate deployment target
def validate_deployment_target(live_pods, splunk_re-
    sult, anr_data):
    if any(pod in ansible_playbooks.runtime_configura-
        tion for pod in live_pods):
        raise DeploymentError("Deployment to live POD
            detected.")
    if                               splunk_result.contains
        ("HIGH_TRAFFIC=TRUE"):
        raise DeploymentError("Deployment to high traf-
            fic environment detected.")
    if anr_data.contains("LIVE"):
        raise DeploymentError("Deployment to live
            server detected.")
//Method to run the deployment process
def run_deployment( ):
    try:
        live_pods=check_dns_status( )
        splunk_result=check_splunk_status( )
        anr_data=check_anr_status( )
        validate_deployment_target(live_pods, splunk_
            result, anr_data)
        execute_playbook(ansible_playbooks.deploy-
            ment_instructions)
```

```
    except DeploymentError as e:
        log_error(e.message)
        abort_deployment( )
//Method to execute Ansible playbook
def execute_playbook(instructions):
    for instruction in instructions.splitlines( )
        run_command(instruction)
//Method to run system commands
def run_command(command, params):
    //Implement the logic to run system commands
    pass
//Method to retrieve DNS information
def retrieve_dns_info(url):
    //Implement the logic to retrieve DNS information
    pass
//Method to compare DNS results with PODs
def compare_with_pods(dns_result, pods):
    //Implement the logic to compare DNS results with
        PODs
    pass
//Method to run a Splunk macro
def run_splunk_macro(macro_name):
    //Implement the logic to run a Splunk macro
    pass
//Method to run a Splunk search
def run_splunk_search(search_string):
    //Implement the logic to run a Splunk search
    pass
//Method to run a Splunk index search
def run_splunk_index_search(index_name):
    //Implement the logic to run a Splunk index search
    pass
//Method to process transponder data
def process_transponder_data(transponder_data):
    //Implement the logic to process transponder data
    pass
//Method to consolidate data
def consolidate_data(processed_data):
    //Implement the logic to consolidate data
    pass
//Method to log errors
def log_error (message):
    //Implement the logic to log errors
    pass
//Method to abort deployment
def abort_deployment( ):
    //Implement the logic to abort deployment
    pass
//Main function to initialize and run the system
def main( ):
    system=DeploymentSystem( )
    system.initialize_system( )
    system.run_deployment( )
main( )
```

The above pseudocode starts by defining the entities involved in the deployment system, including their attributes. These entities include DNSResolver, SplunkAPI, IntelliModule, ANR, AnsiblePlaybooks, DataCenter, and Transponder. The relationships between these entities are also established, with a central DeploymentSystem class managing the interactions.

The initialize_system method sets up the system by creating instances of each entity and initializing the data centers and transponders.

The check_dns_status method determines the live or dark status using the DNS resolver by running 'dig' or 'nslookup' commands on the application URL and comparing the results against the list of PODs. It also performs additional DNS queries to identify further live PODs and compiles them into an array.

The check_splunk_status method uses the Splunk API to determine the live or dark status based on the method specified (macro, search, or parameters).

The check_anr_status method collects data pulses from active transponders in the data centers, processes the data, and updates the ANR with the consolidated server status information.

The validate_deployment_target method checks if the deployment target is valid by ensuring it does not match any live PODs, high-traffic environments, or live servers based on the data from the DNS resolver, Splunk API, and ANR.

The run_deployment method orchestrates the deployment process by running the DNS, Splunk, and ANR checks, validating the deployment target, and executing the Ansible playbook instructions. If any validation fails, it logs an error and aborts the deployment.

The execute_playbook method runs the deployment instructions from the Ansible playbook by executing each command.

Supporting methods like run_command, retrieve_dns_info, compare_with_pods, run_splunk_macro, run_splunk_search, run_splunk_index_search, process_transponder_data, consolidate_data, log_error, and abort_deployment are defined to handle specific tasks within the system.

Finally, the main function initializes the deployment system and starts the deployment process.

The following provides more specific details regarding the applicable entities and their attributes.

The DNSResolver class is responsible for determining the status of the target environment using DNS resolution. It includes the URL of the application being deployed, a comma-separated string of current DNS entries and their corresponding PODs, and a semi-colon separated string of DNS entries for the component or application.

The SplunkAPI class interacts with Splunk to determine the live or dark status of an environment. It includes the name of a saved macro in Splunk to execute, a search string to run through the Splunk API, and the index name for a Splunk search.

The IntelliModule class is the decision-making engine of the system. It includes rules for making deployment decisions based on validation, as well as the status of the validation process, which could be success or failure.

The ANR (Active Nodes Registry) class maintains the real-time status of servers. It includes data about the current status of servers, periodic updates sent by servers to indicate their status, and the timestamp of when the data pulse was received.

The AnsiblePlaybooks class contains the deployment instructions and configuration details for the deployment environment. It includes the instructions for the deployment process and the runtime configuration.

The DataCenter class is responsible for processing data from transponders. It includes a unit responsible for processing this data and a station that relays data from transponders to the network.

The Transponder class collects and sends data pulses regarding server status. It includes a unique identifier for the transponder, information about the server status collected by the transponder, and the frequency at which the transponder sends status updates.

In the initialization phase, the 'initialize_system' method sets up the system by creating instances of each entity. It initializes the DNS resolver, Splunk API, IntelliModule, ANR, Ansible playbooks, and lists for data centers and transponders. This method prepares the system to perform its tasks.

The DNS status check is carried out by the 'check_dns_status' method. It begins by running 'dig' or 'nslookup' commands on the application URL to retrieve DNS information. The retrieved DNS data is then compared against the list of pods to identify live PODs. Additional 'dig' commands are executed on the URL against each DNS entry listed in dnss to find more live PODs. All identified live PODs are added to an array, which is then returned for further validation.

The Splunk status check is performed by the 'check_splunk_status' method. If a macro name is provided, it runs the specified Splunk macro. If a Splunk search string is provided, it executes the search through the API. If an index name is provided, it performs a search based on the index. The results from the Splunk API provide real-time traffic and performance data, which is used to assess the server's status.

The ANR status check is conducted by the 'check_anr_status' method. It collects data pulses from active transponders located in various data centers. These data pulses contain status information, which is processed and aggregated. The processed data is consolidated into the ANR, providing a comprehensive and up-to-date view of server status. The method returns the ANR data for further validation.

The deployment validation is handled by the 'validate_deployment_target' method. It checks if the deployment environment name (dep_env) contains any live PODs identified by the DNS resolver. It also evaluates Splunk API results to see if high traffic conditions exist and examines the ANR data for live server indications. If any validation step fails, it raises a 'DeploymentError' to prevent deployment to live or high-traffic environments.

The 'run_deployment' method orchestrates the deployment process. It performs DNS, Splunk, and ANR checks to gather validation data. It then validates the deployment target using the gathered data. If validation passes, it executes the Ansible playbook instructions. If validation fails, it logs an error and aborts the deployment.

Supporting methods include 'execute_playbook', which runs the deployment instructions from the Ansible playbook; 'run_command', which executes system commands; 'retrieve_dns_info', which retrieves DNS information for a given URL; 'compare_with_pods', which compares DNS results with the list of PODs to identify live PODs; 'run_splunk_macro', which executes a saved macro in Splunk; 'run_splunk_search', which runs a Splunk search query; 'run_splunk_index_search', which performs a search based on the Splunk index; 'process_transponder_data', which processes data pulses from transponders; 'consolidate_data', which consolidates processed data for the ANR; 'log_error', which logs error messages; and 'abort_deployment', which aborts the deployment process.

The main function initializes the deployment system and starts the deployment process by calling 'run_deployment'. The detailed example flow involves several steps. Initially, the system is initialized with instances of DNSResolver, SplunkAPI, IntelliModule, ANR, AnsiblePlaybooks, DataCenters, and Transponders. The DNS status check involves running 'dig' commands on the application URL, comparing DNS results with PODs, checking additional DNS entries, and identifying live PODs to add to an array. The Splunk status check depends on the specified method (macro, search, or index) and involves a Splunk API call to retrieve real-time traffic data, which is used to determine if the environment is live or high-traffic. The ANR status check collects and processes data pulses from transponders, updating the ANR with consolidated server status data. During validation, the IntelliModule checks if the deployment environment matches any live PODs or high-traffic conditions, and it also validates against the latest ANR data. If all checks pass, the deployment instructions are executed. If any check fails, the deployment is aborted and an error is logged.

The foregoing detailed explanation of the pseudocode provides a comprehensive understanding of how the system functions, ensuring that deployments are performed securely and without impacting live environments.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for automated software deployment and infrastructure reconfiguration using a guardrail system, comprising:

retrieving, by an IntelliModule, DNS information from a Remote Query Interface (RQI) by executing 'dig' or 'nslookup' commands on an application URL to determine IP addresses associated with the URL;

comparing, by the IntelliModule, the retrieved DNS information against a current pod inventory to determine which pods are live by matching the IP addresses and pod identifiers;

executing, by the IntelliModule, additional 'dig' commands on the application URL against each DNS server to identify further live pods, ensuring that all DNS responses are captured;

compiling, by the IntelliModule, an array of the live pods that are identified by aggregating results from multiple DNS queries;

checking, by the IntelliModule, a deployment environment against the array of the live pods to prevent deployments to live servers by performing a string comparison of environment names;

running, by the IntelliModule, a Splunk API call to ascertain a live or dark status of servers based on traffic data, using one of a Splunk search, a saved Splunk macro, or passing values to individual parameters, to determine server activity levels;

comparing, by the IntelliModule, results from the Splunk API call with the DNS information to validate server status and ensure consistency across data sources;

updating, by an Active Nodes Registry (ANR), the server status via an encrypted 5G network using periodic data pulses sent by active radio transponders from data centers servers, ensuring real-time status updates;

processing, by the IntelliModule, the data pulses at a data center level before transmitting them over a 5G backbone to aggregate data from multiple transponders and ensure accurate status reporting;

consolidating, by the ANR, the data from the processed pulses to provide current and reliable server status information by creating a unified status report from all received data pulses;

comparing, by the IntelliModule, the ANR data with the results from the DNS information and Splunk API call to ensure the data sources agree on the server status;

applying, by the IntelliModule, predefined decision-making rules to determine validity of deployment targets based on agreement or disagreement among the DNS information, Splunk API results, and ANR data, including timestamp comparisons and content analysis;

aborting, by the IntelliModule, the deployment if the results from the DNS information and Splunk API agree but differ from outdated ANR data, ensuring that stale data does not influence deployment decisions;

proceeding, by the IntelliModule, with the deployment if the ANR data is more recent and differs from the DNS information and Splunk API results, relying on the most current data for decision making;

utilizing, by the IntelliModule, an encrypted tunnel over the 5G backbone for secure communication during the deployment process, protecting data integrity and preventing unauthorized access; and ensuring, by the IntelliModule, flexibility and scalability of the system by using JSON for data transmission between components, allowing for efficient data parsing and system integration.

2. The method of claim 1, wherein the DNS information is retrieved from multiple DNS servers to enhance accuracy of the live pod identification, reducing risk of relying on a single point of failure.

3. The method of claim 2, wherein the IntelliModule discards the results from the DNS information if they do not match the most recent data from the ANR, prioritizing a most up-to-date and reliable data source.

4. The method of claim 3, wherein the Splunk API call includes evaluating traffic patterns to determine load and performance status of the servers, providing a comprehensive view of server activity.

5. The method of claim 4, wherein the ANR data is updated at fixed intervals of one minute to ensure real-time accuracy, allowing for continuous monitoring and immediate status updates.

6. The method of claim 5, wherein the decision-making rules include a condition to abort the deployment if the ANR data is older than ten minutes and differs from the other sources, ensuring that only the freshest data guides the deployment process.

7. The method of claim 6, wherein the encrypted 5G network used for updating the ANR is isolated from the primary network to prevent interference and maintain data integrity, providing an additional layer of security and reliability.

8. The method of claim 7, wherein the IntelliModule performs additional validation by cross-referencing the deployment environment with historical deployment data stored in the ANR, allowing for more informed decision-making based on past deployments.

9. The method of claim 8, wherein the JSON data transmission includes metadata tags to facilitate efficient parsing and processing by the IntelliModule, enhancing data organization and retrieval.

10. The method of claim 9, wherein the IntelliModule generates detailed deployment logs that include timestamps and validation results from the DNS information, Splunk API, and ANR data, to support audit and troubleshooting processes, ensuring comprehensive documentation of the deployment process for future reference.

11. A system for automated software deployment and infrastructure reconfiguration using a guardrail mechanism, comprising:

one or more processors implementing an IntelliModule configured to retrieve DNS information from a Remote Query Interface (RQI) by executing 'dig' or 'nslookup' commands on an application URL to determine an IP addresses associated with the URL;

the one or more processors implementing the IntelliModule further configured to compare the retrieved DNS information against a current pod inventory to determine which pods are live by matching IP addresses and pod identifiers, ensuring that deployment targets are correctly identified;

the one or more processors implementing the IntelliModule further configured to execute additional 'dig' commands on the application URL against each DNS server to identify further live pods, ensuring comprehensive capture of all DNS responses to accurately reflect network status;

the one or more processors implementing the IntelliModule further configured to compile an array of the live pods that were identified by aggregating results from multiple DNS queries, thus forming a complete and accurate list of live servers;

the one or more processors implementing the IntelliModule further configured to check a deployment environment against the the array of the live pods to prevent deployments to live servers by performing a string comparison of environment names, thus avoiding inadvertent disruptions in live environments;

the IntelliModule further configured to run a Splunk API call to ascertain the live or dark status of servers based on traffic data, using one of a Splunk search, a saved Splunk macro, or passing values to individual parameters, to determine server activity levels and ensure deployments are made to appropriate environments;

the one or more processors implementing the IntelliModule further configured to compare the results from the Splunk API call with the DNS information to validate server status and ensure consistency across data sources, thus enhancing reliability of deployment decisions;

an Active Nodes Registry (ANR) configured to update the server status via an encrypted 5G network using periodic data pulses sent by active radio transponders from servers within data centers, ensuring real-time status updates and independence from the primary network;

the one or more processors implementing the IntelliModule further configured to process the data pulses at a data center level before transmitting them over a 5G backbone, aggregating data from multiple transponders and ensuring accurate status reporting across the network;

the ANR further configured to consolidate the data from the processed pulses to provide current and reliable server status information by creating a unified status report from all received data pulses, ensuring the most up-to-date information is available for deployment decisions;

the one or more processors implementing the IntelliModule further configured to compare the ANR data with the results from the DNS information and Splunk API call to ensure the data sources agree on the server status, thus providing a comprehensive validation mechanism;

the one or more processors implementing the IntelliModule further configured to apply predefined decision-making rules to determine the validity of deployment targets based on agreement or disagreement among the DNS information, Splunk API results, and ANR data, including timestamp comparisons and content analysis to ensure the most reliable data is used for decisions;

the one or more processors implementing the IntelliModule further configured to abort the deployment if the results from the DNS information and Splunk API agree but differ from outdated ANR data, ensuring that stale data does not influence deployment decisions and reducing risk of erroneous deployments;

the one or more processors implementing the IntelliModule further configured to proceed with the deployment if the ANR data is more recent and differs from the DNS information and Splunk API results, relying on the most current data for decision making and ensuring accuracy of deployments;

the one or more processors implementing the IntelliModule further configured to utilize an encrypted tunnel over the 5G backbone for secure communication during the deployment process, protecting data integrity and preventing unauthorized access to ensure the security of deployment operations;

the one or more processors implementing the IntelliModule further configured to ensure flexibility and scalability of the system by using JSON for data transmission between components, allowing for efficient data parsing and system integration, and facilitating seamless communication across different parts of the deployment process.

12. The system of claim 11, wherein the DNS information is retrieved from multiple DNS servers to enhance accuracy of the live pod identification, reducing risk of relying on a single point of failure and ensuring comprehensive validation.

13. The system of claim 12, wherein the one or more processors implementing the IntelliModule is further configured to discard the results from the DNS information if they do not match the most recent data from the ANR, prioritizing the most up-to-date and reliable data source, thus ensuring deployment decisions are based on the best available information.

14. The system of claim 13, wherein the Splunk API call includes evaluating traffic patterns to determine load and performance status of the servers, providing a comprehensive view of server activity and aiding in making informed deployment decisions.

15. The system of claim 14, wherein the ANR is further configured to update the server status at fixed intervals of one minute to ensure real-time accuracy, allowing for continuous monitoring and immediate status updates, thus enhancing the reliability of the deployment process.

16. The system of claim 15, wherein the decision-making rules include a condition to abort the deployment if the ANR data is older than ten minutes and differs from the other sources, ensuring that only the freshest data guides the deployment process, thus reducing risk of errors.

17. The system of claim 16, wherein the encrypted 5G network used for updating the ANR is isolated from the primary network to prevent interference and maintain data integrity, providing an additional layer of security and reliability, ensuring that updates to the ANR are always accurate and secure.

18. The system of claim 17, wherein the one or more processors implementing the IntelliModule is further configured to perform additional validation by cross-referencing the deployment environment with historical deployment data stored in the ANR, allowing for more informed decision-making based on past deployments and providing a context-aware deployment process.

19. The system of claim 18, wherein the JSON data transmission includes metadata tags to facilitate efficient parsing and processing by the one or more processors implementing the IntelliModule, enhancing data organization and retrieval, and ensuring that all transmitted data is accurately interpreted and utilized by the system components.

20. A method for automated software deployment and infrastructure reconfiguration to prevent unintended deployment to a live server, comprising:

retrieving, by the IntelliModule, DNS information from a Remote Query Interface (RQI) to determine an IP addresses associated with an application URL;

comparing, by the IntelliModule, the retrieved DNS information against a current pod inventory to determine which pods are live;

executing, by the IntelliModule, additional queries on the application URL against each DNS server to identify further live pods;

compiling, by the IntelliModule, an array of the live pods that were identified;

checking, by the IntelliModule, a deployment environment against the array of the live pods to prevent deployments to live servers;

running, by the IntelliModule, an API call to ascertain the live or dark status of servers based on traffic data, using one of a search, a macro, or passing values to individual parameters;

comparing, by the IntelliModule, results from the API call with the DNS information to validate server status;

updating, by an Active Nodes Registry (ANR), the server status using periodic data pulses sent by active transponders from servers within data centers;

processing, by the IntelliModule, the data pulses at a data center level before transmitting them over a network;

consolidating, by the ANR, the data from the processed pulses to provide current and reliable server status information;

comparing, by the IntelliModule, the ANR data with the results from the DNS information and API call to ensure all data sources agree on the server status;

applying, by the IntelliModule, predefined decision-making rules to determine the validity of deployment targets based on agreement or disagreement among the DNS information, API results, and ANR data;

aborting, by the IntelliModule, the deployment if the results from the DNS information and API agree but differ from outdated ANR data;

proceeding, by the IntelliModule, with the deployment if the ANR data is more recent and differs from the DNS information and API results;

by the IntelliModule, a secure communication channel for data transmission during the deployment process; and ensuring, by the IntelliModule, flexibility and scalability of the system by using structured data formats for transmission between components.

* * * * *